(12) United States Patent
Melic et al.

(10) Patent No.: US 10,982,454 B2
(45) Date of Patent: Apr. 20, 2021

(54) SAFETY FENCE ASSEMBLY

(71) Applicants: Jonathan J. Melic, Burlington (CA); Brandon Melic, Burlington (CA)

(72) Inventors: Jonathan J. Melic, Burlington (CA); Brandon Melic, Burlington (CA)

( * ) Notice: Subject to any disclaimer, the term of this patent is extended or adjusted under 35 U.S.C. 154(b) by 589 days.

(21) Appl. No.: 15/844,155

(22) Filed: Dec. 15, 2017

(65) Prior Publication Data

US 2019/0186158 A1 Jun. 20, 2019

(51) Int. Cl.
*E04G 21/32* (2006.01)
*E04G 5/14* (2006.01)
*G01L 5/00* (2006.01)

(52) U.S. Cl.
CPC ..... *E04G 21/3233* (2013.01); *E04G 21/3223* (2013.01); *G01L 5/0057* (2013.01); *E04G 2005/148* (2013.01)

(58) Field of Classification Search
CPC ... E04G 25/04; E04G 25/08; E04G 2025/045; E04G 5/14; E04G 5/04; E04G 2005/148; E04G 21/32; E04G 21/3204; E04G 21/3223; E04G 21/3233; E04G 21/3242
See application file for complete search history.

(56) References Cited

U.S. PATENT DOCUMENTS

| | | | | |
|---|---|---|---|---|
| 3,662,993 A | * | 5/1972 | Lionetto | E04G 7/22 |
| | | | | 256/65.13 |
| 3,734,467 A | * | 5/1973 | Weeden | E04H 17/163 |
| | | | | 256/65.04 |
| 3,822,850 A | * | 7/1974 | Elias | E04H 17/18 |
| | | | | 248/551 |
| 3,863,900 A | | 2/1975 | Dagiel et al. | |
| 3,920,220 A | * | 11/1975 | Elias | E04G 25/04 |
| | | | | 254/98 |
| 3,980,278 A | * | 9/1976 | Elias | E04G 21/3233 |
| | | | | 256/59 |
| 4,733,844 A | * | 3/1988 | Molloy | E04F 21/1805 |
| | | | | 248/354.1 |
| 5,709,366 A | | 1/1998 | Speece | |
| 5,758,742 A | * | 6/1998 | Chiou | E04G 5/04 |
| | | | | 182/3 |

(Continued)

FOREIGN PATENT DOCUMENTS

| | | | | |
|---|---|---|---|---|
| CH | 358225 A | * | 11/1961 | E04G 25/08 |
| DE | 2300750 A1 | * | 7/1973 | E04G 25/08 |

(Continued)

OTHER PUBLICATIONS

Written Opinon of the ISA for PCT/CA2018/051603 dated Mar. 14, 2019.

(Continued)

*Primary Examiner* — Jonathan P Masinick
(74) *Attorney, Agent, or Firm* — Crowe & Dunlevy, P.C.

(57) ABSTRACT

A modular safety fence assembly is disclosed. The safety fence may include a fence panel assembly having a top rail, a bottom rail, and mesh panel. The safety fence panel assembly may also support post assembly capable of supporting the fence panel assembly and an anchor assembly which may anchor the support post assembly to the floor using one or more relatively shallow holes formed in the floor.

13 Claims, 19 Drawing Sheets

(56) References Cited

U.S. PATENT DOCUMENTS

| | | | |
|---|---|---|---|
| 6,554,235 B1 * | 4/2003 | Fortier | A47B 57/565 |
| | | | 248/122.1 |
| 6,679,482 B2 * | 1/2004 | Allenbaugh | E04G 21/3233 |
| | | | 182/113 |
| 7,055,807 B2 | 6/2006 | Pesta | |
| 7,255,312 B2 | 8/2007 | Melic | |
| 7,510,152 B2 | 3/2009 | Melic | |
| 7,530,551 B2 | 5/2009 | Kuenzel | |
| 7,699,276 B2 | 4/2010 | Melic | |
| 8,132,792 B2 | 3/2012 | Perris | |
| 8,152,118 B2 | 4/2012 | Melic | |
| 8,398,036 B2 | 3/2013 | Svedberg | |
| 8,453,794 B2 * | 6/2013 | Melic | E04G 21/3276 |
| | | | 182/3 |
| 8,590,849 B2 | 11/2013 | Melic | |
| 8,851,058 B2 * | 10/2014 | Hoang | B24D 3/10 |
| | | | 125/15 |
| 9,163,418 B2 | 10/2015 | Ditta et al. | |
| 9,714,069 B2 | 7/2017 | Garelick et al. | |
| 10,053,880 B2 * | 8/2018 | Melic | E04G 21/3233 |
| 10,184,256 B2 * | 1/2019 | Melic | E04G 25/08 |
| 10,487,522 B2 * | 11/2019 | Melic | E04H 17/22 |
| 2007/0272909 A1 | 11/2007 | Payne | |
| 2013/0192149 A1 | 8/2013 | Roach | |
| 2015/0137058 A1 | 5/2015 | Platt | |
| 2016/0130775 A1 | 5/2016 | Brackin et al. | |
| 2017/0037653 A1 | 2/2017 | Schopf et al. | |
| 2017/0138070 A1 | 5/2017 | Subzda | |
| 2019/0226231 A1 * | 7/2019 | Hohmann | E04G 21/3233 |

FOREIGN PATENT DOCUMENTS

| | | | | | |
|---|---|---|---|---|---|
| DE | 2318796 A1 | * | 10/1973 | | F16B 2/246 |
| DE | 29918569 U1 | * | 1/2000 | | E04G 25/08 |
| DE | 202008003789 U1 | | 10/2008 | | |
| EP | 1070789 B1 | | 6/2004 | | |
| EP | 2325416 B1 | * | 12/2017 | | E04G 21/3223 |
| FR | 935536 A | * | 6/1948 | | E21D 15/581 |
| FR | 1126083 A | * | 11/1956 | | G05G 1/00 |
| GB | 284564 A | * | 2/1928 | | F16B 2/246 |
| GB | 573382 A | * | 11/1945 | | E21D 15/36 |
| WO | WO-02075166 A1 | * | 9/2002 | | F16B 7/14 |
| WO | 2014127680 A1 | | 8/2014 | | |
| WO | 2017120666 A1 | | 7/2017 | | |

OTHER PUBLICATIONS

"Fence Base—Fence 84", Integrity Worldwide; retrieved from Internet Oct. 3, 2017, URL: http://www.directindustry.com/prod/integrity-worldwide-inc/product-63679-1240341.html#product-item_1240271, 9 pages.

"Right Angle Fasteners", Modular Components & Automation, retrieved from Internet Oct. 3, 2017, UR: http://www.modularcomponents.com.au/building-blocks/right-angle-fasteners/, 2 pages.

"Temporary Fence Brace", Integrity Worldwide, retrieved from Internet Oct. 3, 2017; URL: http://www.directindustry.com/prod/integrity-worldwide-inc,/product-63679-1240341.html#product-item_1240307, 8 pages.

* cited by examiner

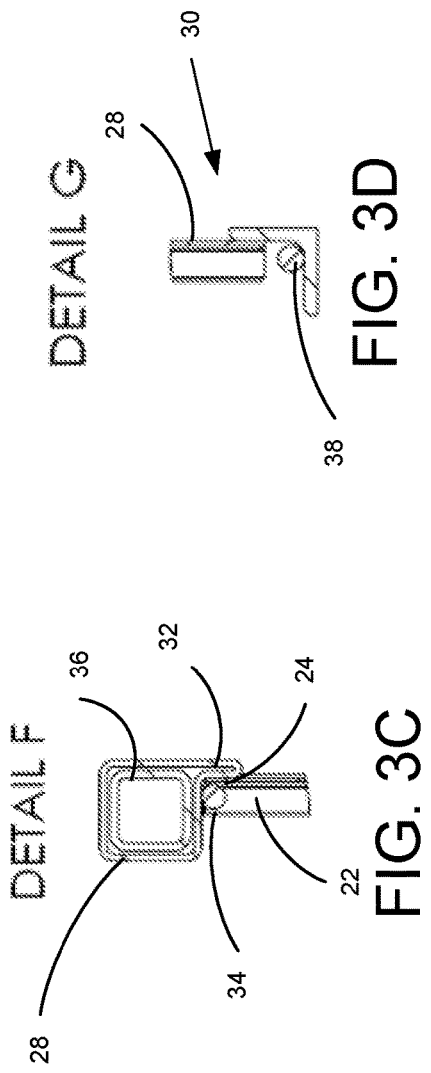
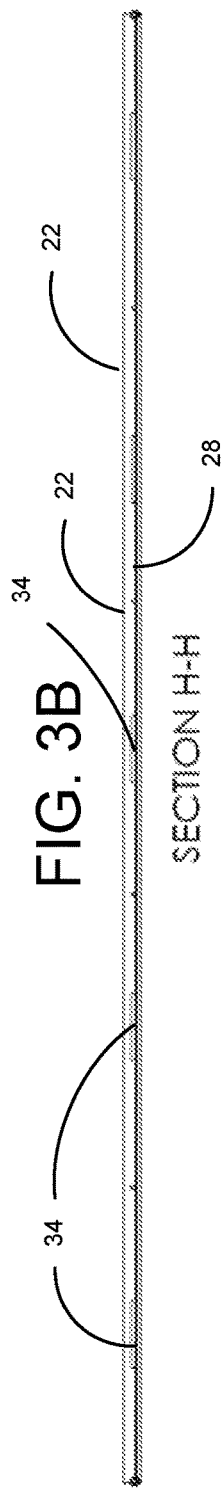

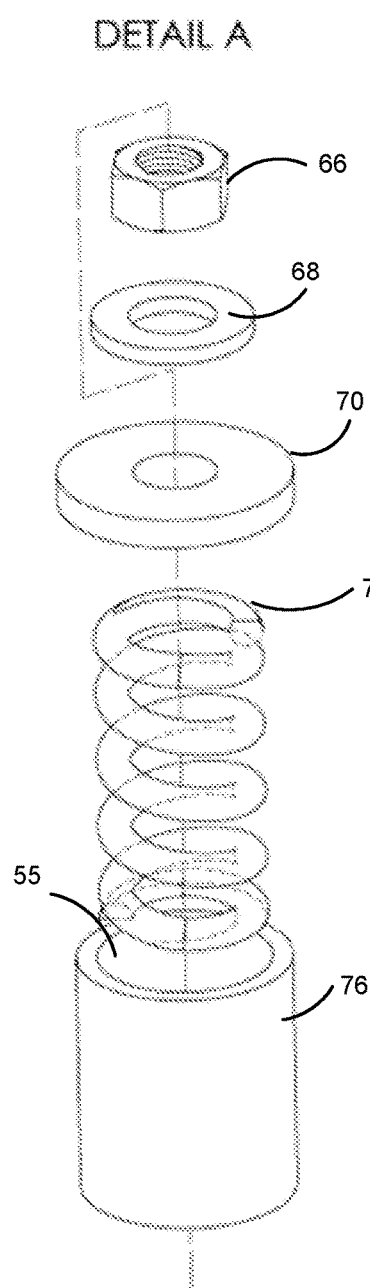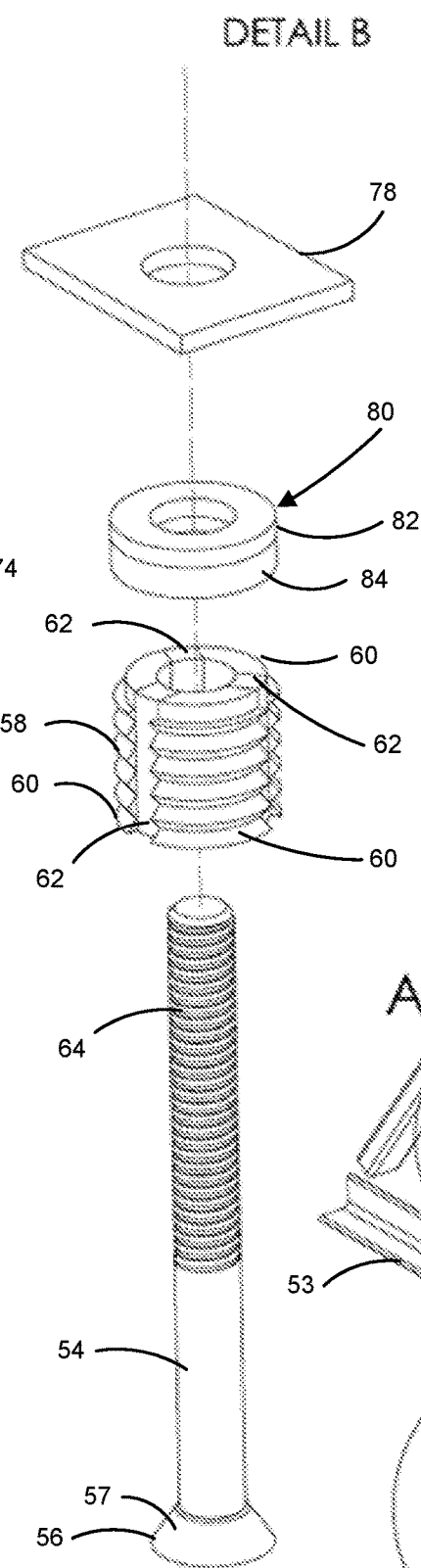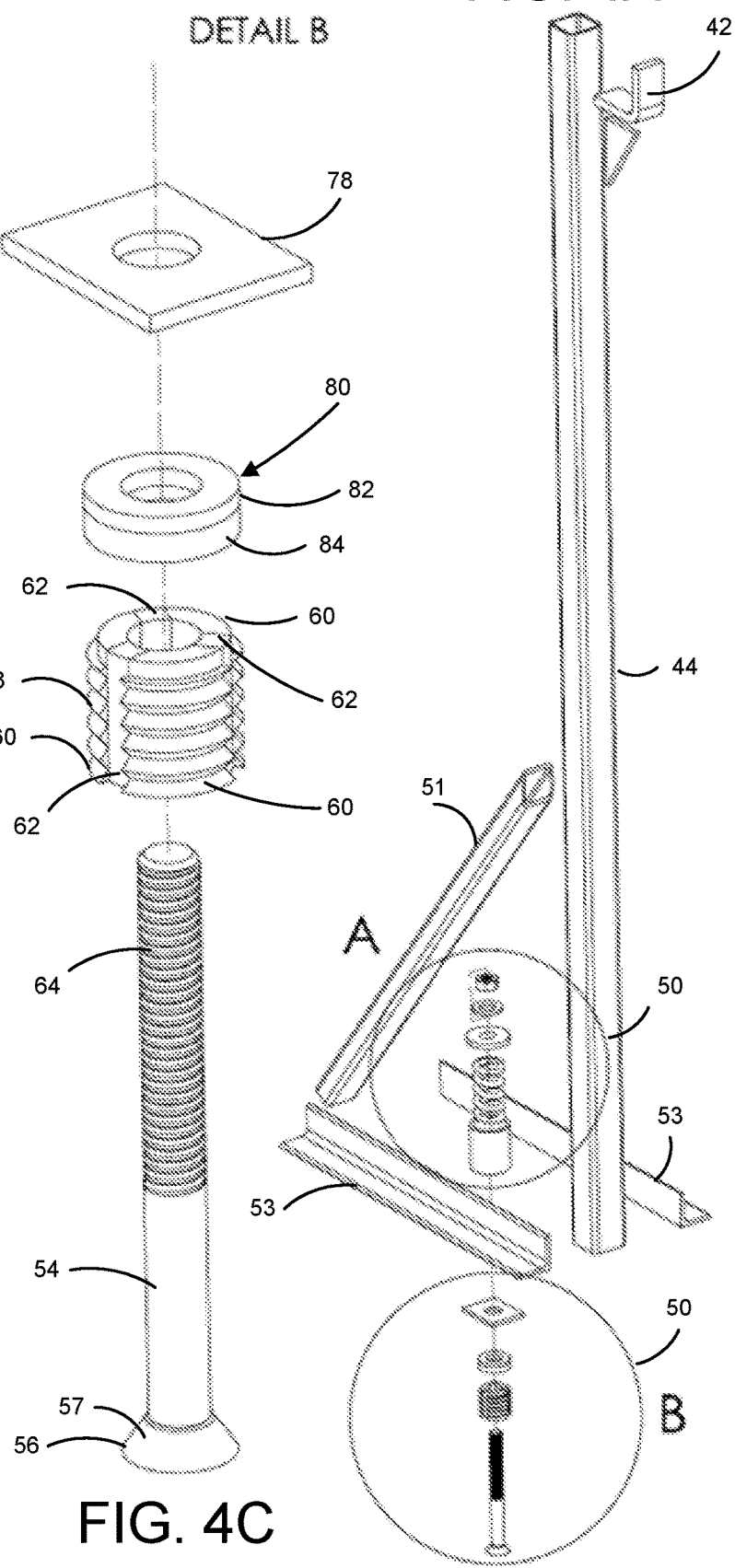
FIG. 4A
FIG. 4B
FIG. 4C

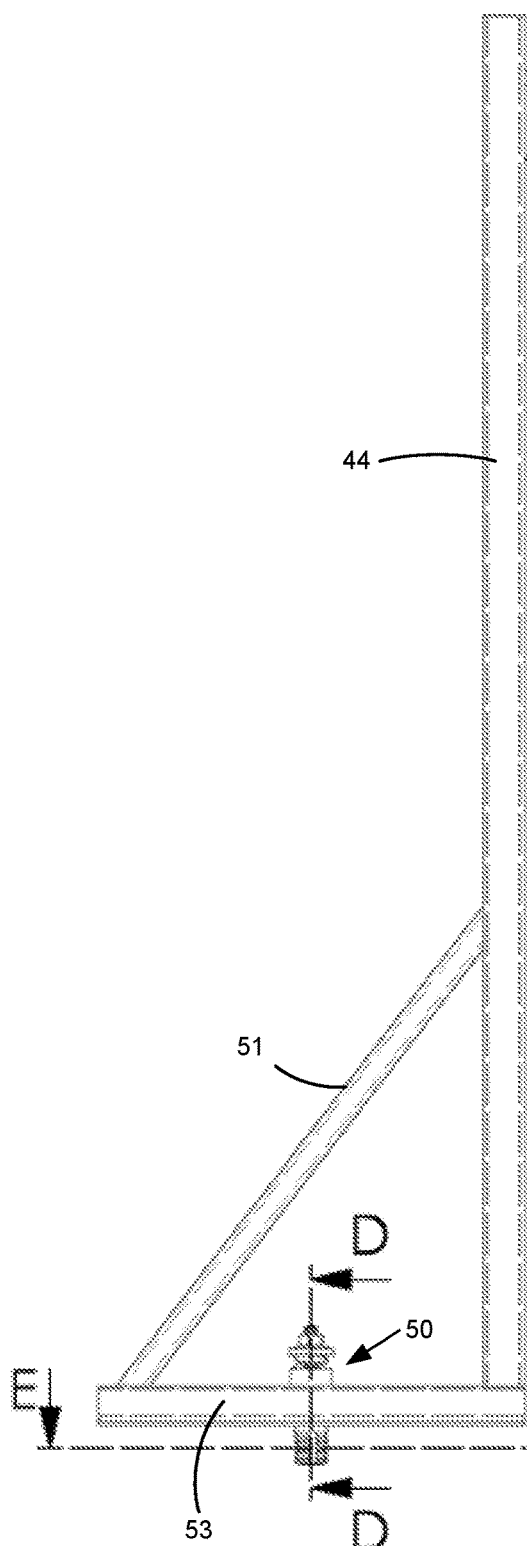
FIG. 5A
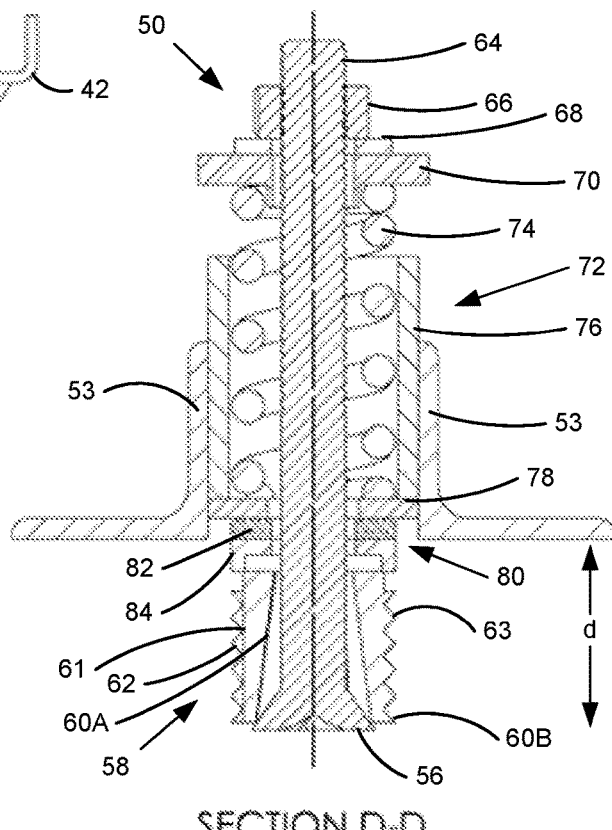
SECTION D-D
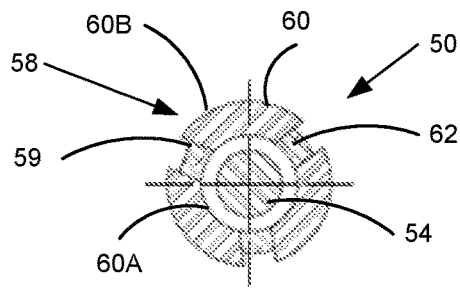
SECTION E-E
FIG. 5C

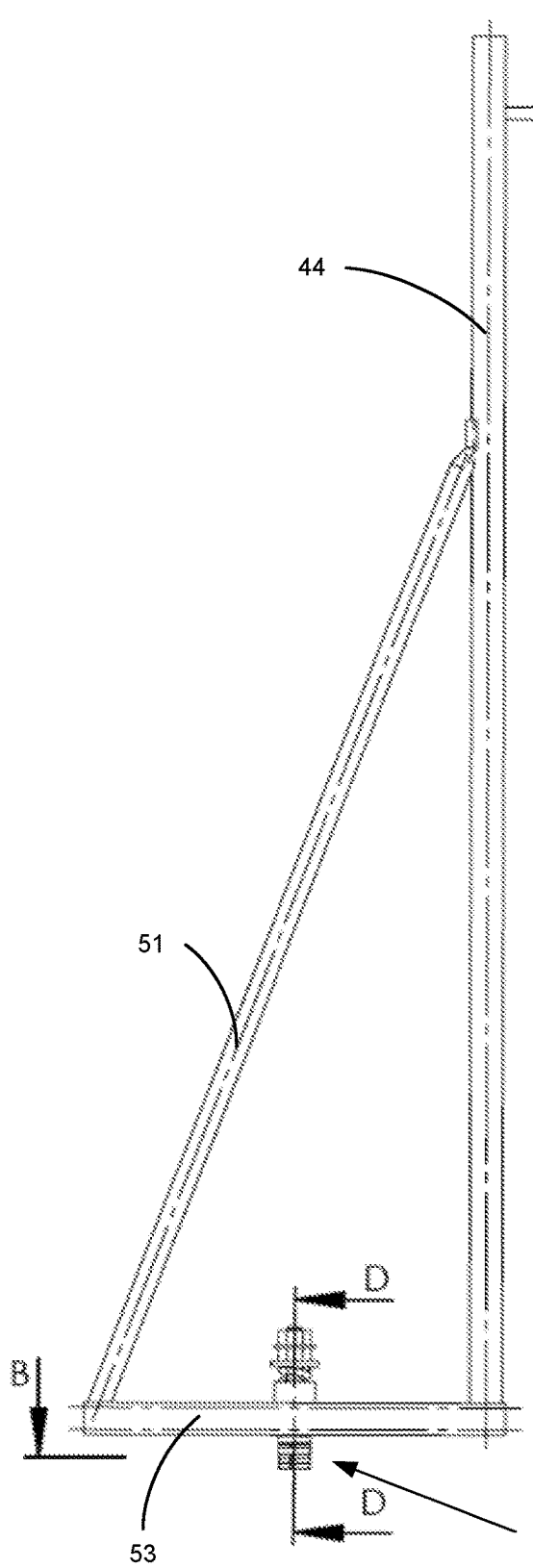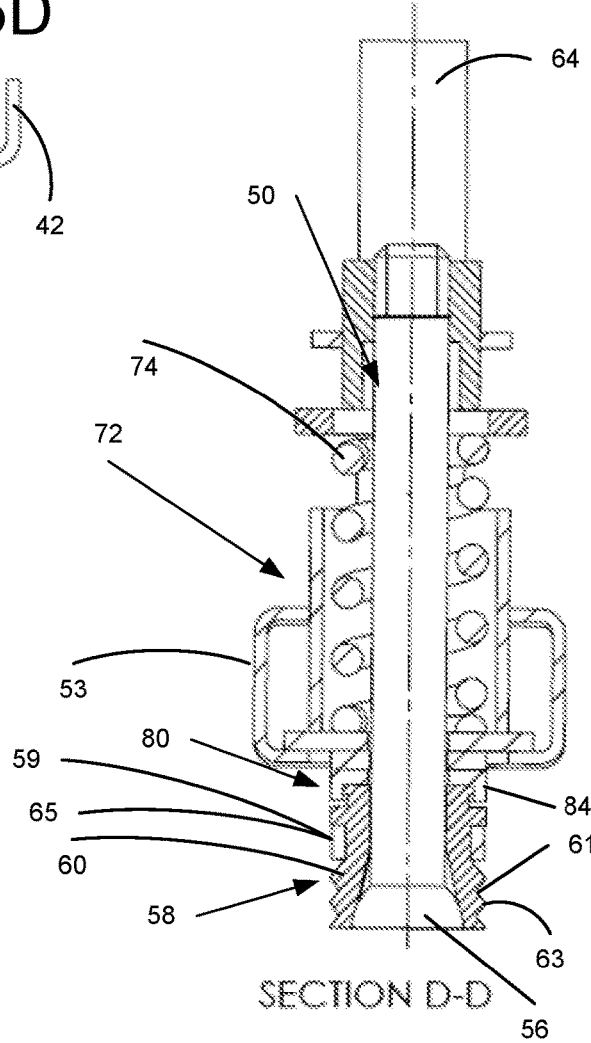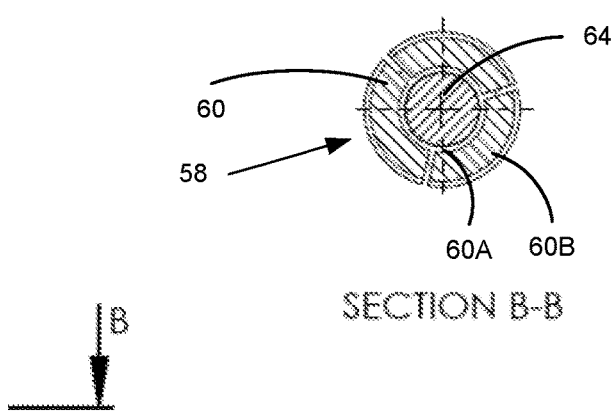

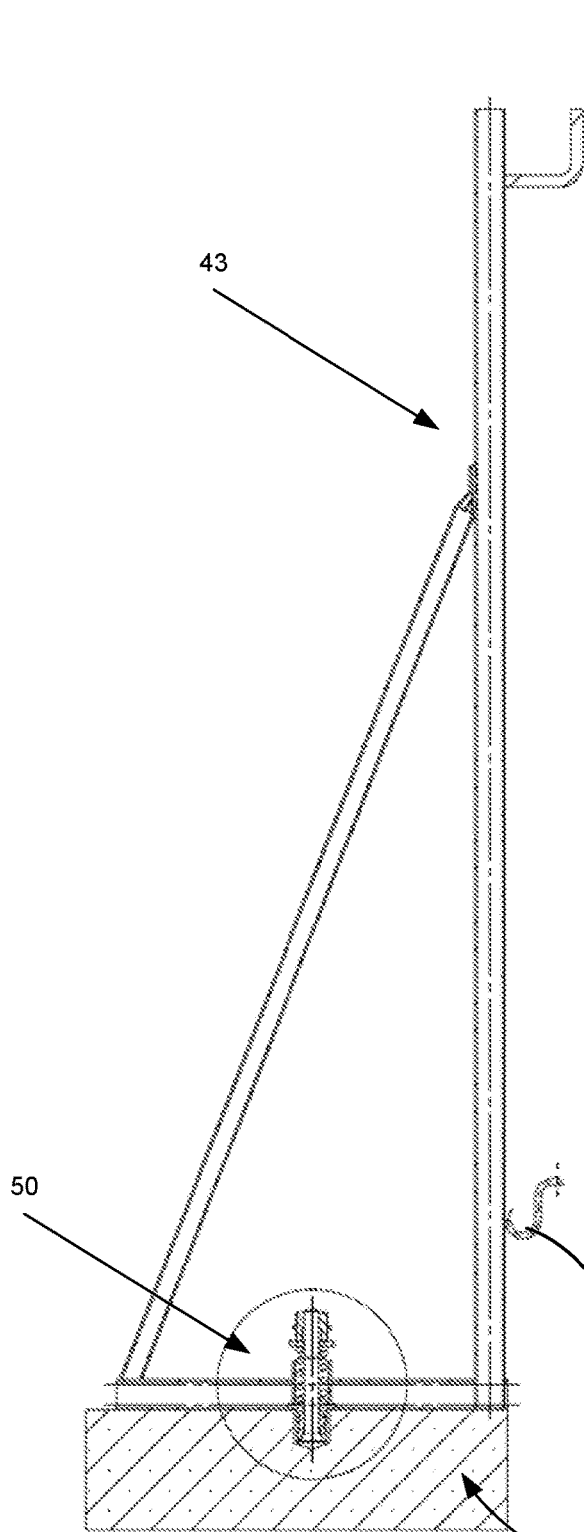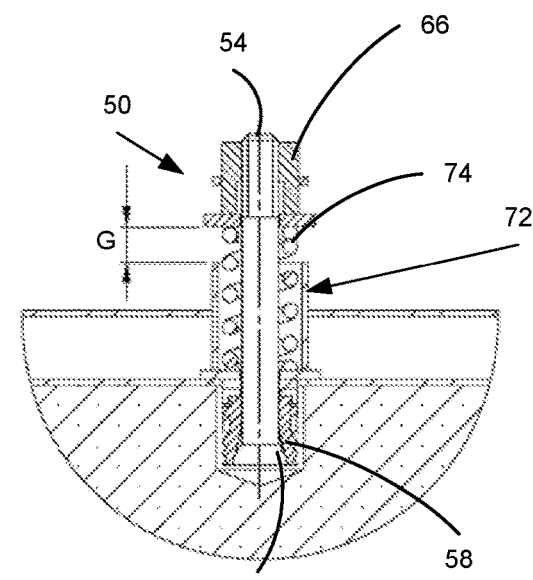
FIG. 6D
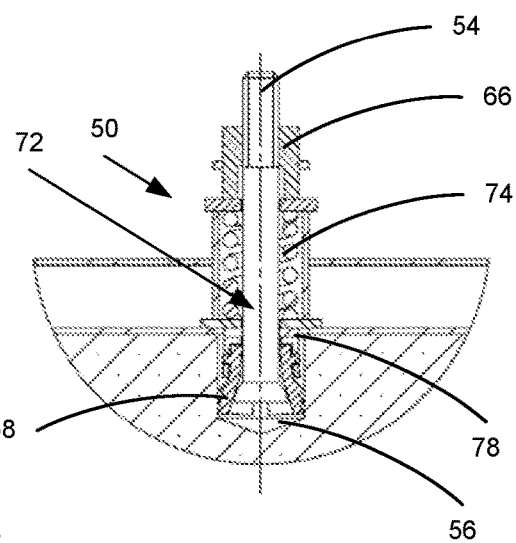
FIG. 6E
FIG. 6C

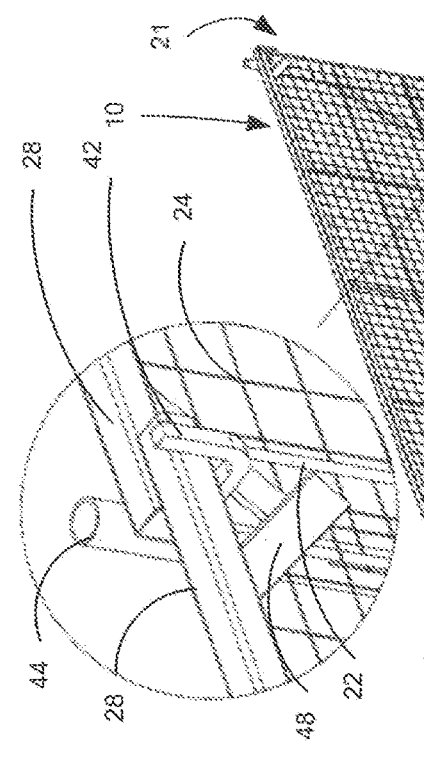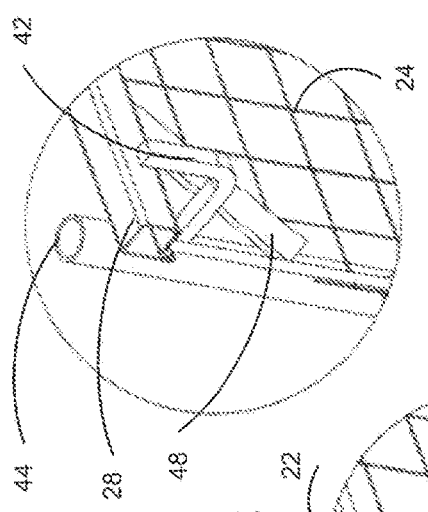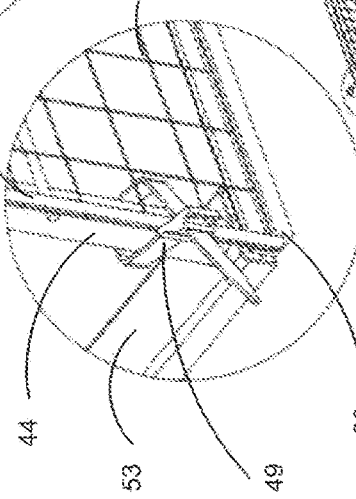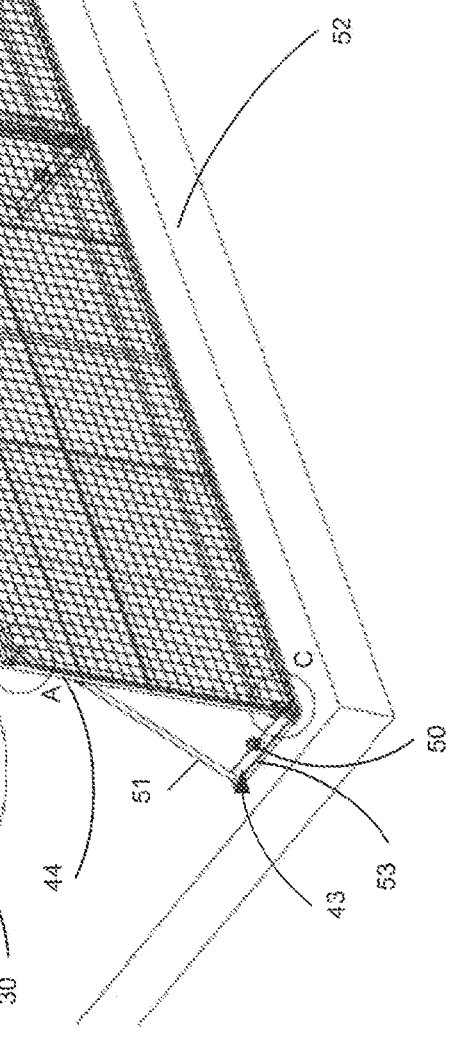

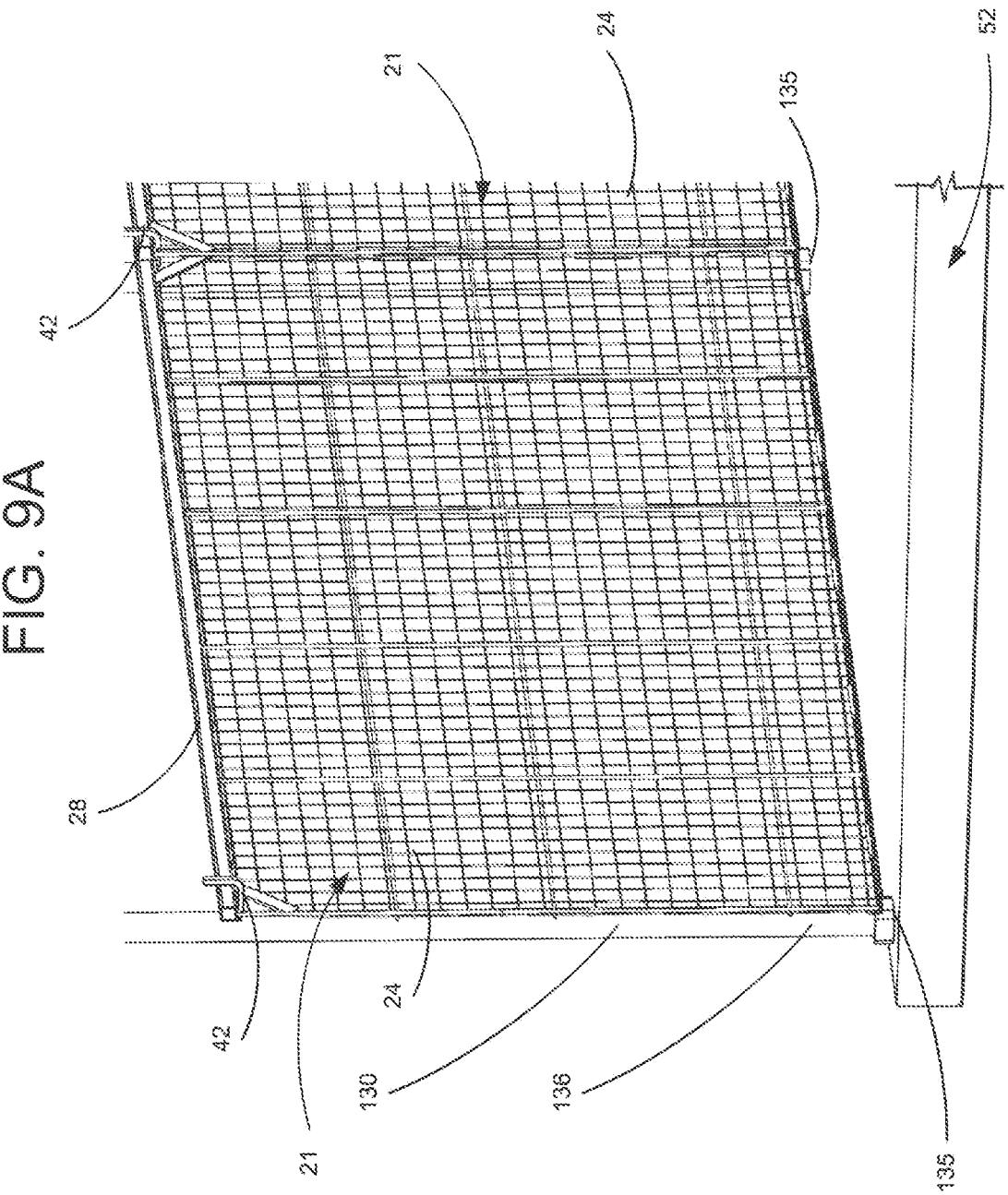

FIG. 10
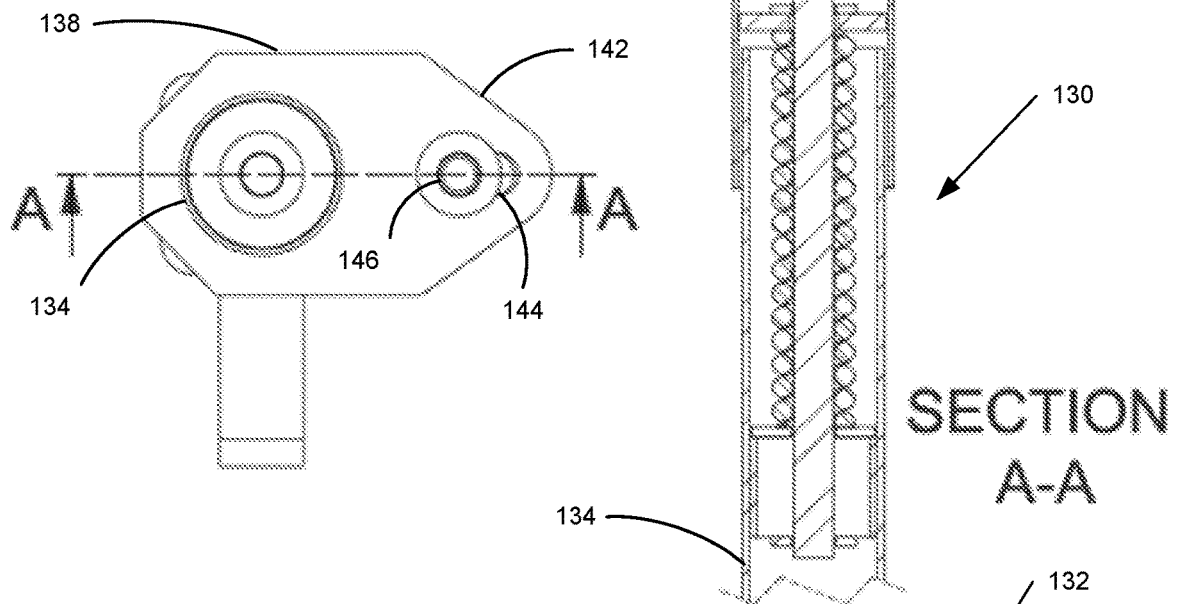
FIG. 11
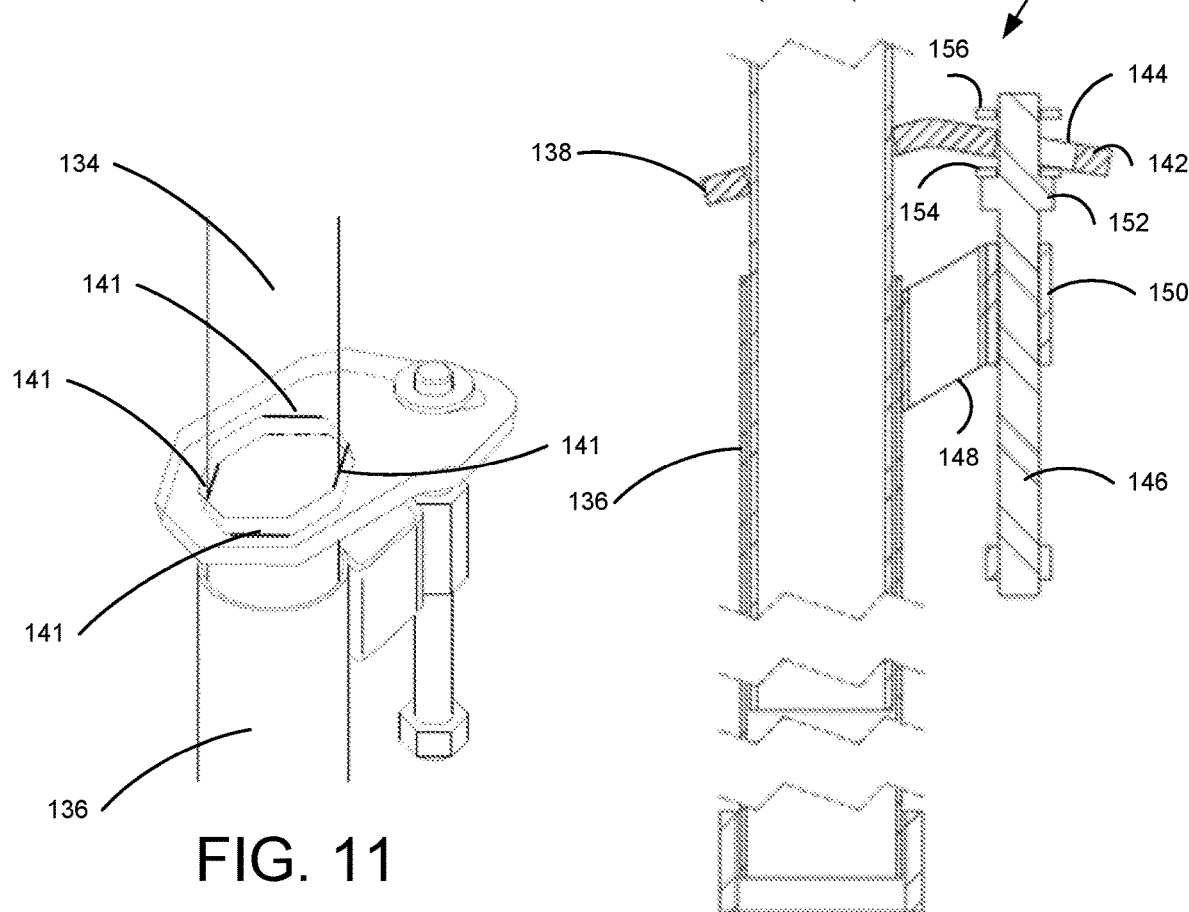
FIG. 10A

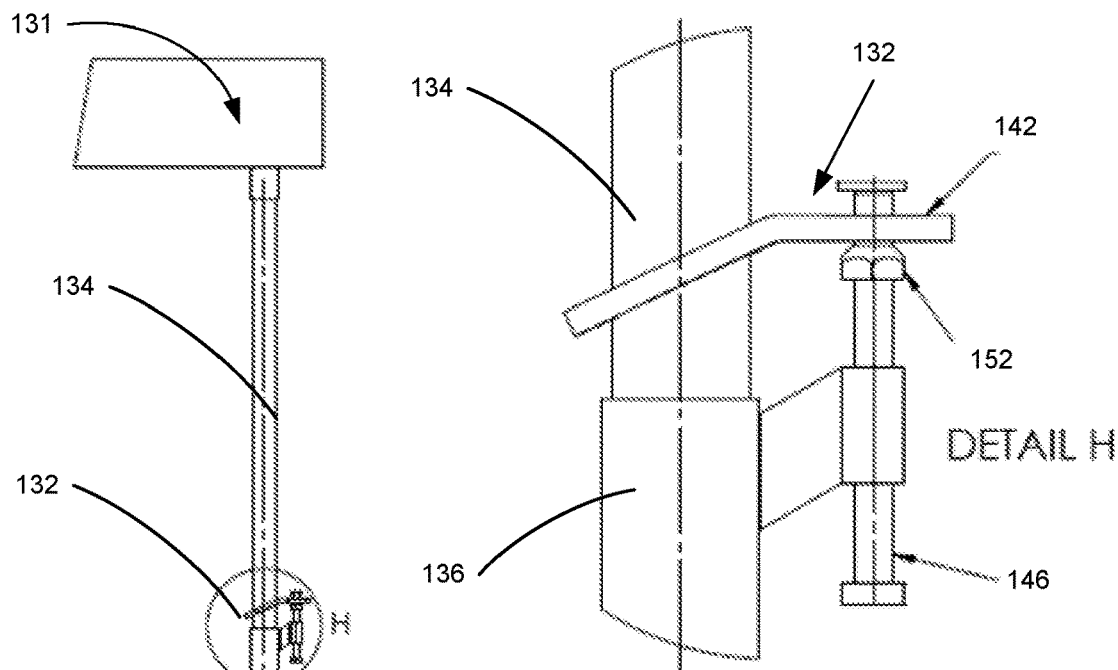
FIG. 13A
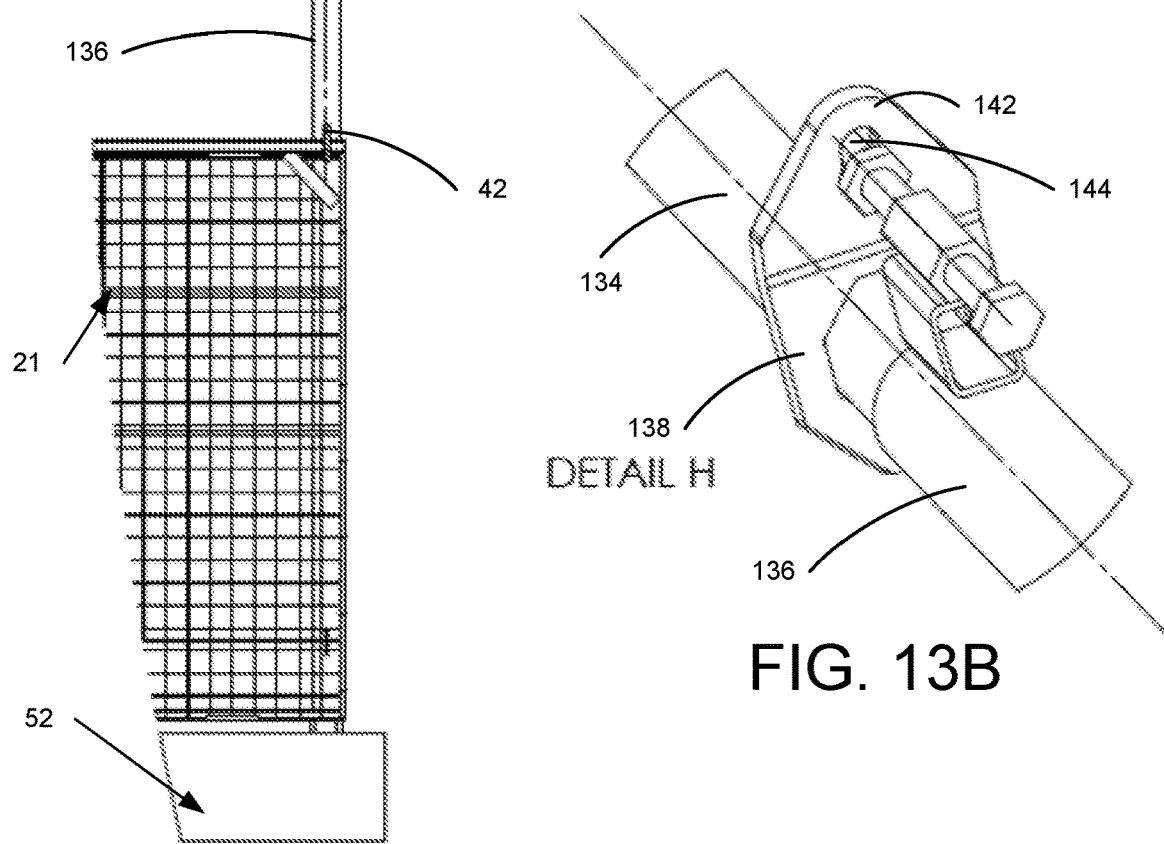
FIG. 13B
FIG. 13

… (1)

SAFETY FENCE ASSEMBLY

FIELD OF INVENTION

The disclosure relates to security fence assemblies and the like, and more specifically to modular security fence assemblies used primarily during high-rise building construction and associated anchors which may be used with the modular security fence assembly.

BACKGROUND

During construction of buildings, and particularly high-rise buildings, safety fences or barriers are often erected on the building perimeter before any outside walls are built. These fences serve to protect people, equipment, and debris from falling off the edge of the building as it is being constructed.

These safety barriers are generally modular and are moved from one work floor to another work floor or from one worksite to another as construction progresses. Thus, these safety fences must be relatively easy to setup and take down while doing relatively little damage to the floor and/or ceiling to which they are engaged. Safety fences of this type generally include a plurality of posts supporting intervening fence panels.

Although many attempts have been made to design improved safety barrier systems, there remains a need for a system that is easily erected and dismantled and which does little damage to the floor and/or ceiling to which it is engaged.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to one aspect, a safety fence assembly is disclosed. According to another aspect, an anchor assembly is disclosed.

According to one aspect, the safety fence assembly may include a fence panel assembly comprising: a top rail having a first end and a second end; a bottom rail having a first end and a second end; a first side rail extending between the first end of the top rail and the first end of the bottom rail; a second side rail extending between the second end of the top rail and the second end of the bottom rail; a plurality of vertical rods extending generally vertically between the top rail and the bottom rail; a plurality of horizontal rods extending generally horizontally between the first side rail and the second side rail; and a mesh panel extending between the top rail and the bottom rail and between the first side rail and the second side rail.

The safety fence assembly may also include a support post assembly comprising: a base configured to engage a floor; a support post extending substantially vertically upward from the base; a mounting hook extending from the support post, the mounting hook configured to engage the top rail of the fence panel assembly; and an anchor assembly configured to engage at least one hole in the floor and removably attach the support post assembly to the floor. The anchor assembly is configured to attach the support post assembly to the floor such that at least 1000 pounds of pulling force is required to remove the support post assembly from the at least one hole; and the depth of the at least one hole is less than one inch. The at least one hole may comprise only a single hole.

The support post assembly may further comprise: a rod extending through the base of the support post assembly, the rod having a spreader at a bottom portion; and an anchor sleeve extending around the rod. A bottom portion of the anchor sleeve is configured to extend outward as a downward force moves the anchor sleeve downward over the spreader.

The anchor sleeve may comprise a plurality of gripping segments. Each of the plurality of gripping segments may have a plurality of raised ridges. The anchor sleeve may further comprise at least one elastomeric member connecting the plurality of gripping segments. The elastomeric member may be bonded to and extend between each of the plurality of gripping segments. The elastomeric member may comprise a plurality of elastomeric portions, the plurality of elastomeric portions extending between each of the plurality of gripping segments. The elastomeric member may comprise at least one elastomeric band surrounding an outer surface of each of the gripping segments. The gripping segments may be one piece or multiple pieces joined together and may be metallic or polymeric.

The anchor assembly may further comprise a load gauge, the load gauge configured to represent to a user when the appropriate amount of force has been applied to engage the anchor assembly within the hole. The load gauge may comprise a coil spring positioned around the rod.

According to another aspect, an anchor assembly is disclosed. The anchor assembly may comprise: a rod, the rod having a spreader at a bottom portion; and an anchor sleeve extending around the rod. A bottom portion of the anchor sleeve is configured to extend outward as a downward force moves the anchor sleeve downward over the spreader; and the anchor assembly is configured to removably engage a hole in a surface.

The anchor assembly may be configured to removably engage a hole such that at least 1000 pounds of pulling force is required to remove the anchor assembly; and the depth of the hole is less than one inch.

The anchor sleeve may comprise a plurality of gripping segments; and each of the plurality of gripping segments may have a plurality of raised ridges. The anchor sleeve further may comprise at least one elastomeric member connecting the plurality of gripping segments. The elastomeric member may be bonded to and extend between each of the plurality of gripping segments. The elastomeric member may comprise at least one elastomeric band surrounding an outer surface of each of the gripping segments.

The anchor assembly may further comprise a load gauge, the load gauge configured to represent to a user when the appropriate amount of force has been applied to engage the anchor assembly within the hole. The load gauge may comprise a coil spring positioned around the rod.

According to another aspect a safety fence assembly is disclosed. The safety fence assembly may include a fence panel assembly comprising: a top rail having a first end and a second end; a bottom rail having a first end and a second end; a first side rail extending between the first end of the top rail and the first end of the bottom rail; a second side rail extending between the second end of the top rail and the second end of the bottom rail; a plurality of vertical rods extending generally vertically between the top rail and the bottom rail; a plurality of horizontal rods extending generally horizontally between the first side rail and the second side rail; and a mesh panel extending between the top rail and the bottom rail and between the first side rail and the second side rail. The safety fence assembly may also include a support post assembly. The support post assembly may include a telescoping post extending substantially vertically, and having a first tube having a top end, the top end configured to engage a ceiling; and a second tube having a bottom end, the bottom end configured to engage a floor. The support post may also include a mounting hook extending from the telescoping post, the mounting hook configured to engage the top rail of the fence panel assembly; and a grab plate assembly, the grab plate assembly having a grab plate configured to engage the first tube. The grab plate assembly may be configured to raise the first tube relative to the second tube.

The grab plate further may comprise a tube receiving opening, the tube receiving opening configured to engage the first tube. The tube receiving opening may have a polygon shape. The tube receiving opening may be configured to engage the first tube at a plurality of contact points.

The grab plate may further comprise a lever arm. The grab plate assembly may also include a bracket engaged with the second tube; and an actuating rod engaged with the bracket. The actuating rod may be configured to engage the grab plate and raise the first tube relative to the second tube. The actuating rod may be configured to raise the first tube relative to the second tube by rotating the actuating rod. The actuating rod may extend through a slot in the grab plate.

The grab plate assembly may further comprise a wear system configured to alert a user when the grab plate assembly requires replacing.

The support post assembly may further comprise a load gauge configured to indicate when the desired load has been applied between the floor and the ceiling by the telescoping post. The load gauge may include a coiled spring within the first tube; a visibly different portion of the first tube which is visibly different than remaining portions of the first tube; and a cap extending over the first tube and engaged with the coiled spring, the cap configured to cover the visibly different portion of the first tube desired load has been applied between the floor the ceiling by the telescoping post.

According to another aspect, a support post assembly is disclosed. The support post assembly may include a telescoping post extending substantially vertically, and having a first tube having a top end, the top end configured to engage a ceiling; and a second tube having a bottom end, the bottom end configured to engage a floor. The support post assembly may also include a grab plate assembly, the grab plate assembly having a grab plate configured to engage the first tube. The grab plate assembly may be configured to raise the first tube relative to the second tube.

The grab plate may further comprise a tube receiving opening, the tube receiving opening configured to engage the first tube. The tube receiving opening may have a polygon shape. The tube receiving opening may be configured to engage the first tube at a plurality of contact points.

The grab plate assembly may further comprise a bracket engaged with the second tube; and an actuating rod engaged with the bracket. The actuating rod may be configured to engage the grab plate and raise the first tube relative to the second tube. The grab plate may further comprise a lever arm and the actuating rod may be configured to engage the lever arm. The actuating rod may be configured to raise the first tube relative to the second tube by rotating the actuating rod. The grab plate assembly may further comprise a wear system configured to alert a user when the grab plate assembly requires replacing.

The support post assembly may further comprise a load gauge configured to indicate when the desired load has been applied between the floor and the ceiling by the telescoping post.

BRIEF DESCRIPTION OF THE DRAWINGS

The present invention is illustrated by way of example and not limited in the accompanying figures in which like reference numerals indicate similar elements and in which:

FIG. 3A is a side cross-sectional view of the fence panel assembly of FIG. 3 taken along line E-E in FIG. 3 according to one or more aspects described herein.

FIG. 3B is a bottom cross-sectional view of the fence panel assembly of FIG. 3 taken along line H-H in FIG. 3 according to one or more aspects described herein.

FIG. 3C is a detailed view of a portion of the fence panel assembly of Detail F shown in FIG. 3A according to one or more aspects described herein.

FIG. 3D is a detailed view of a portion of the fence panel assembly of Detail G shown in FIG. 3A according to one or more aspects described herein.

FIG. 4A is an exploded perspective view of an anchor post assembly according to one or more aspects described herein.

FIG. 4B is a detailed view of a portion of the anchor post assembly of Detail A shown in FIG. 4A according to one or more aspects described herein.

FIG. 4C is a detailed view of a portion of the anchor post assembly of Detail B shown in FIG. 4A according to one or more aspects described herein.

FIG. 5A is a side view of an anchor post assembly according to one or more aspects described herein.

FIG. 5B is a side cross-sectional view of an anchor assembly taken along line D-D of FIG. 5A according to one or more aspects described herein.

FIG. 5C is a side cross-sectional view of an anchor assembly taken along line E-E of FIG. 5A according to one or more aspects described herein.

FIG. 5D is a side view of an anchor post assembly according to one or more aspects described herein.

FIG. 5E is a side cross-sectional view of an anchor assembly taken along line D-D of FIG. 5D according to one or more aspects described herein.

FIG. 5F is a side cross-sectional view of an anchor assembly taken along line B-B of FIG. 5D according to one or more aspects described herein.

FIG. 6C is a side cross-sectional view of a security fence assembly according to one or more aspects described herein.

FIG. 6D is a side cross-sectional view of a portion of the security fence assembly of FIG. 6C showing the anchor assembly in a closed or unengaged position according to one or more aspects described herein.

FIG. 6E is a side cross-sectional view of a portion of the security fence assembly of FIG. 6C showing the anchor assembly in an extended or engaged position according to one or more aspects described herein.

FIG. 7 is a perspective view of a security fence assembly according to one or more aspects described herein.

FIG. 7A is a detailed view of a portion of the anchor post assembly of Detail A shown in FIG. 7 according to one or more aspects described herein.

FIG. 7B is a detailed view of a portion of the anchor post assembly of Detail B shown in FIG. 7 according to one or more aspects described herein.

FIG. 7C is a detailed view of a portion of the anchor post assembly of Detail C shown in FIG. 7 according to one or more aspects described herein.

FIG. 9A is a perspective view of a portion of the security fence assembly of FIG. 9 according to one or more aspects described herein

FIG. 10 is a top view of a telescoping anchor post assembly according to one or more aspects described herein.

FIG. 10A is a side cross-sectional view of the telescoping anchor post assembly taken along line A-A of FIG. 10 according to one or more aspects described herein.

FIG. 11 is a perspective view of a portion of a telescoping anchor post assembly according to one or more aspects described herein.

FIG. 13 is a side view of a portion of a security fence assembly having telescoping anchor post assembly according to one or more aspects described herein FIG. 13A is a detailed side view of the telescoping anchor post assembly of Detail H shown in FIG. 13 according to one or more aspects described herein.

FIG. 13B is a detailed perspective view of the telescoping anchor post assembly of Detail H shown in FIG. 13 according to one or more aspects described herein.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this invention relate to modular security fence assemblies and associated anchors. According to various aspects and embodiments, the modular security fence assemblies and associated anchors described herein may be formed of one or more of a variety of materials, such as metals (including metal alloys), polymers, and composites, and may be formed in one of a variety of configurations, without departing from the scope of the invention. It is understood that the modular security fence assemblies and associated anchors may contain components made of several different materials. Additionally, the components may be formed by various forming methods. For example, metal components, may be formed by forging, fabricating, welding, molding, casting, stamping, machining, and/or other known techniques. Additionally, polymer components, such as elastomers, can be manufactured by polymer processing techniques, such as various molding and casting techniques and/or other known techniques.

The various figures in this application illustrate examples of modular security fence assemblies and associated anchors for the modular security fence assemblies according to this invention. When the same reference number appears in more than one drawing, that reference number is used consistently in this specification and the drawings refer to the same or similar parts throughout.

Figure 1:
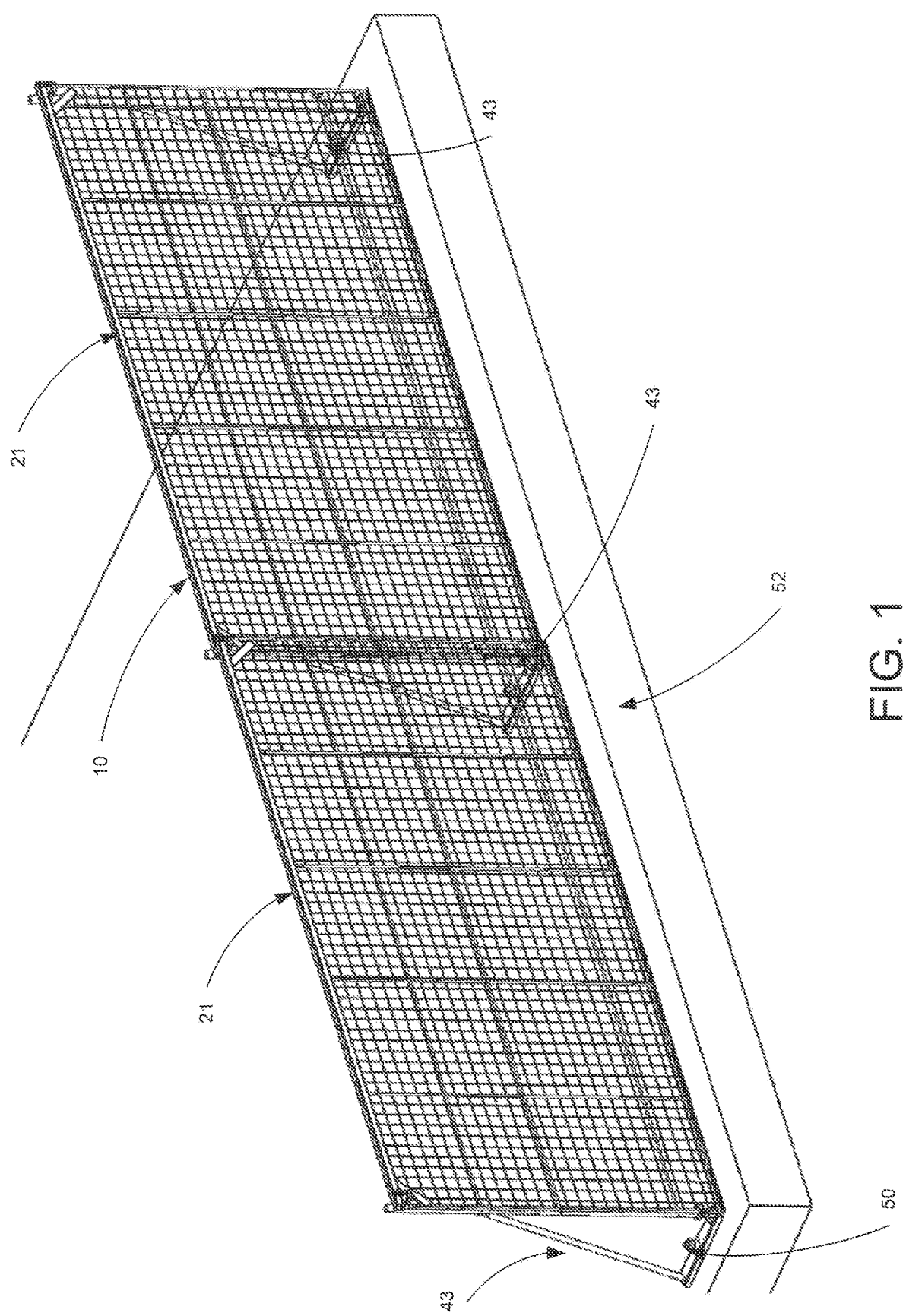
FIG. 1 is a perspective view of a security fence assembly according to one or more aspects described herein.

As will be described in greater detail below, this application illustrates examples of a modular security fence assembly. An exemplary assembled modular security fence assembly 10 is shown in FIG. 1. As described herein, in embodiments the modular security fence assemblies 10 generally include two parts. First, the modular security fence assemblies described herein generally include one or more fence panel assemblies 21, primarily shown in FIGS. 2-3D. Second, the modular security fence assemblies described herein generally include one or more support post assemblies 43, primarily shown in FIGS. 4A-6E and FIGS. 9-13B. As will be described below, the support post assemblies 43 may be anchored to the ground or concrete floor 52 using various anchor assemblies 50, and in other embodiments the support post assemblies 43 may be engaged by pressure between the floor and the ceiling. The fence panel assemblies 21 may then be connected to the support post assemblies 43 to form a modular security fence assembly 10.

Fence Panel Assembly

Figure 2:
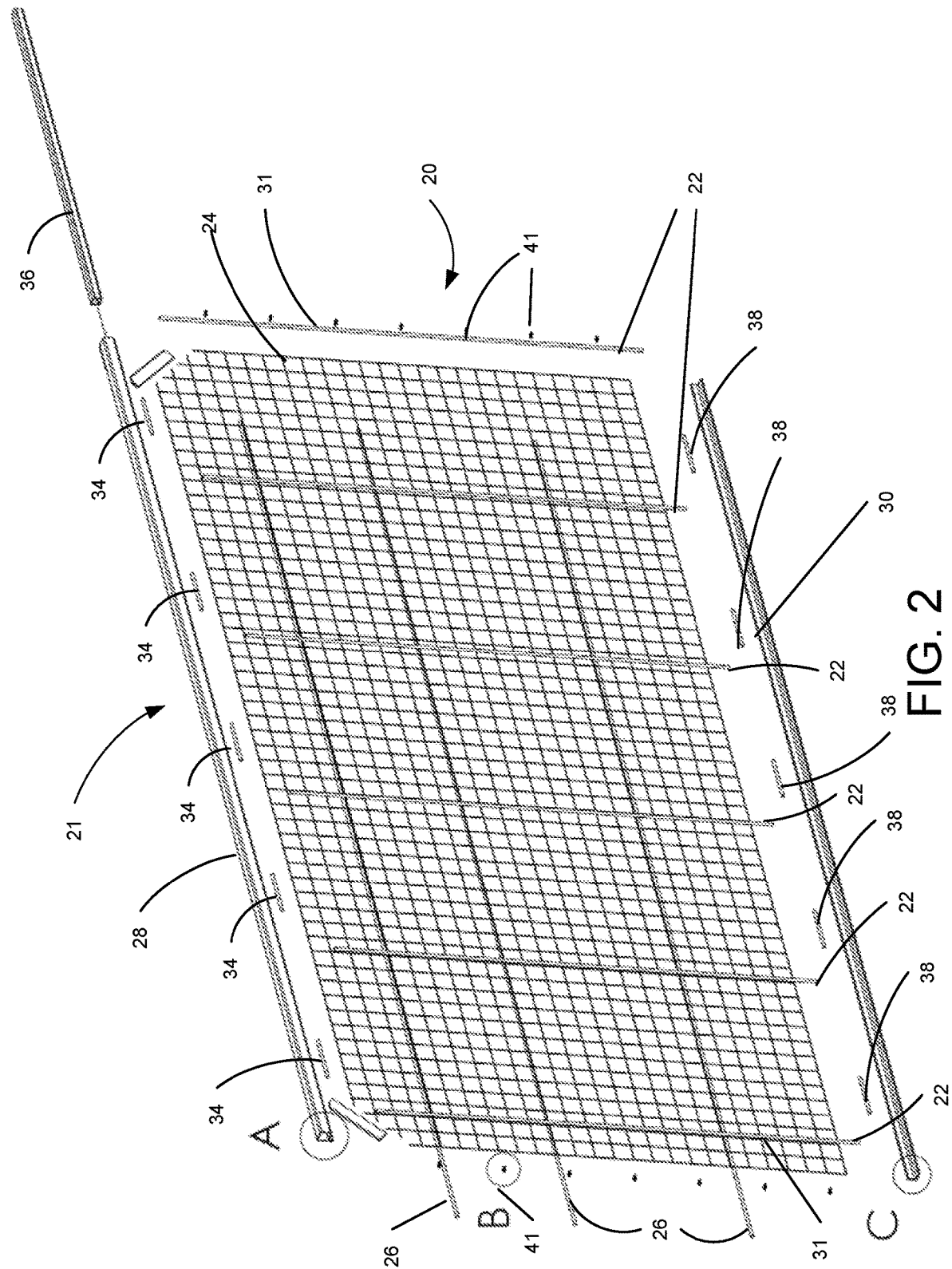
FIG. 2 is an exploded perspective view of a fence panel assembly according to one or more aspects described herein.
Figure 2C:
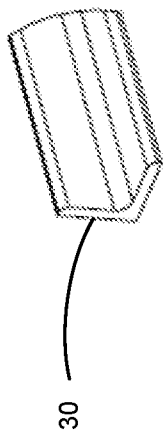
FIG. 2C is a detailed view of a portion of the fence panel assembly of Detail C shown in FIG. 2 according to one or more aspects described herein.
Figure 2B:
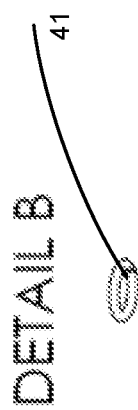
FIG. 2B is a detailed view of a portion of the fence panel assembly of Detail B shown in FIG. 2 according to one or more aspects described herein.
Figure 3:
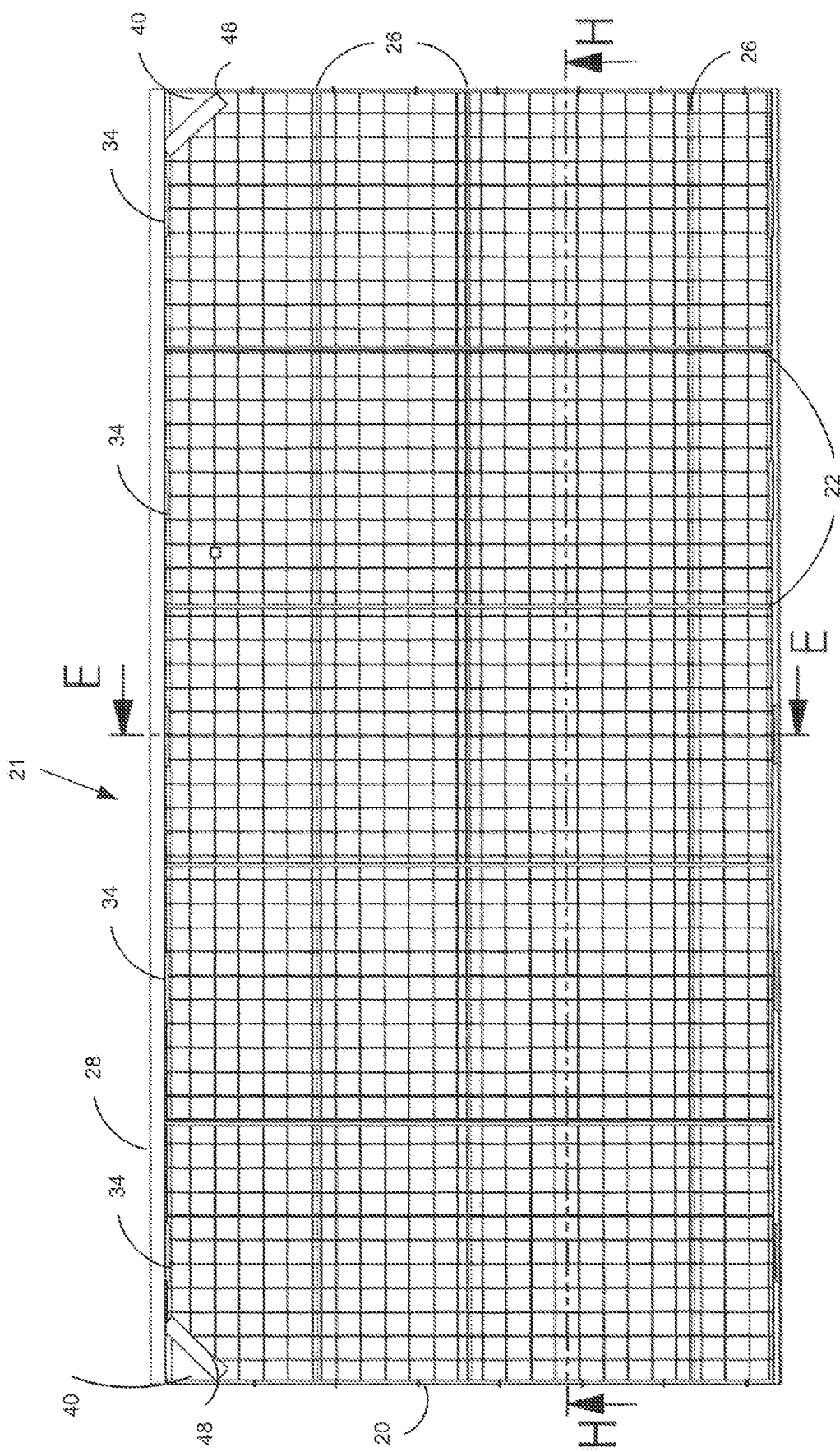
FIG. 3 is a front view of a fence panel assembly according to one or more aspects described herein.

Referring now primarily to FIGS. 2-3D, an exemplary fence panel assembly 21 is shown. FIG. 2 depicts a partially exploded isometric view of an exemplary fence panel assembly 21 and FIG. 3 depicts a front view of an exemplary fence panel assembly 21. The fence panel assembly 21 may generally be rigid, and in some embodiments the fence panel assembly 21 may be inexpensive and/or lightweight The fence panel assembly 21 may include a body 20 having a top rail 28 extending generally horizontally along a top portion of the body 20; a bottom rail 30 extending generally horizontally along a bottom portion of the body 20; and, in one embodiment, side rails 31 extending substantially vertically along outer sides of the body 20. In an alternative embodiment, the side rails can be omitted to further reduce the weight of the fence panel assembly 21. Between the top rail 28 and bottom rail 30 the body 20 also includes a mesh portion or mesh panel 24. In some embodiments, the mesh 24 may be "chicken wire;" and alternatively another lightweight mesh wire, mesh fabric, mesh plastic, mesh composite, or other suitable material may be used instead of the chicken wire 24. For example, in some embodiments, the mesh panel 24 may comprise a solid piece of sheet metal.

The fence panel assembly 21 may also include one or more reinforcement rods such as the generally vertically extending rods 22 and the generally horizontally extending rods 26 shown in FIGS. 2 and 3. These rods may add stability to the fence panel assembly 21 and may allow for easier assembly of the fence panel assembly 21. These rods can be used in place of the side rails and will provide the fence with the necessary strength and integrity. In some embodiments the mesh panel 24 may be sandwiched between the vertically extending rods 22 and the horizontally extending rods 26. For example, in some embodiments, the fence panel assembly 21 includes a first outer layer comprising a plurality of generally vertically extending rods 22 which are spaced from each other along the length of the panel assembly 21; a second or middle layer made of the mesh panel 24; and a third or inner layer comprising a plurality of horizontally extending rods 26 spaced from each other along the height of the panel assembly 21. In other embodiments, the ordering of the layers may be reversed. The mesh panel 24 may be secured to the rods 22, and 26 by electric resistance welding in an automated fashion or using any other suitable method. The welding of the mesh panel 24 to the rods provide additional structural rigidity and integrity to the fence assembly to make the assembly stronger to withstand greater loads applied to the fence assembly.

Figure 2A:
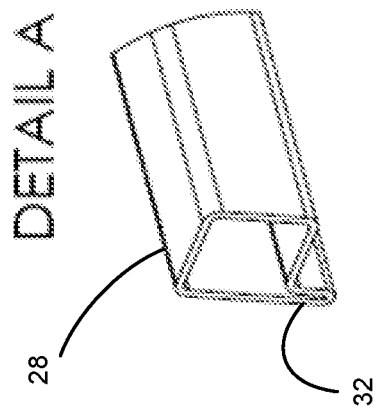
FIG. 2A is a detailed view of a portion of the fence panel assembly of Detail A shown in FIG. 2 according to one or more aspects described herein.

As discussed above, the top rail 28 extends generally horizontally along a top portion of the body 20. As best shown in the detail view shown in FIG. 2A, the top rail 28 may have a generally square or rectangular cross-sectional shape; however, other cross-sectional shapes may be used including, for example, circular and triangular cross-sectional shapes. The top rail 28 may also include a dependent lip 32 extending downward from the square or rectangular cross-sectional shape portion. In some embodiments, the top rail 28, including the dependent lip 32 of the top rail, may be engaged with the vertical rods 22, horizontal rods 26, and/or the mesh 24. In some embodiments, and as best shown in detail view FIGS. 2 and 3C, the mesh 24 is engaged with the dependent lip 32 and is captured between the lip 32 and longitudinally spaced welding beads 34. In use, the top rail 28 is hung on mounting hooks of the support posts and the support posts will carry the weight of the fence panel assembly 21.

Additionally, in some embodiments, the top rail 28 may include a reinforcement tube 36. As shown in FIG. 2, the reinforcement tube 36 may have a cross-sectional shape mimicking, but slightly smaller than, the inner cross-sectional shape of the top rail 28, such that the reinforcement tube 36 may be inserted into the top rail 28. In some embodiments, the reinforcement tube 36 may extend substantially the entire length of the top rail 28. However, in other embodiments the reinforcement tube 36 does not extend the full length of the top rail 28. Advantageously, this may save weight and manufacturing costs.

As discussed above the bottom rail 30 extends generally horizontally along a bottom portion of the body 20. As best shown in detail view, FIG. 3D, the bottom rail 30 may have a generally L-shape profile but any convenient profile may be used. In some embodiments, the bottom rail 30 may be engaged with the vertical rods 22, horizontal rods 26, and/or the mesh 24. As best shown in FIG. 3D, the bottom edge of the panel of mesh 24 and the vertically extending rods 22 are secured to the bottom rail 30, by longitudinally spaced welding beads 38. Advantageously this arrangement defines a rigid kick plate which may meet required building code standards. Additionally, in some situations because the mesh panel 24 extends substantially the entire height of the fence panel assembly a user may not need to use additional netting or other similar safety devices which may otherwise be required.

The fence panel assembly 21 may also include attachment rings 41 which may be used to secure the vertical edges of the mesh panel 24 to the side rails 31 or to vertically extending rods 22 disposed over said vertical edges of the panel of chicken wire. In other embodiments, the mesh panel 24 may be attached to side rails 31 using any suitable method including, for example, welding.

The fence panel assembly may also include a pair of mounting openings 40 as shown in FIG. 3. The mounting openings 40 may form an open area in the mesh panel 24 and in some embodiments the mounting openings may be located at the corners where the side rails 31 meet the top rail 28. In some embodiments, the mounting openings 40 are defined by cut-outs formed in the mesh panel or chicken wire 24 and may be covered to protect a user from injury by coming into contact with the mesh panel or chicken wire 24. For example, as shown in FIG. 3 the openings 40 may be covered by U-shaped molding 48. As will be discussed below, the mounting openings 40 may be used to engage the fence panel assemblies 21 with the support post assemblies 43, whereby the support post assemblies 43 will carry the weight of the fence panel assembly.

Support Post Assembly

Referring now in more detail to the support post assembly 43 an example of which is shown in FIGS. 4A-5F (FIGS. 4A-4C and FIGS. 5A-5C show a first embodiment of a support post assembly and anchor sleeve and FIGS. 4D-4E and FIGS. 5D-5E show a second similar embodiment of a fence post assembly and anchor sleeve). In one embodiment, the support post assembly 43 may include a support post 44. The support post 44 may extend generally vertically upward and may have a height from the ground level similar to the height of the panel assembly 21. The support post assembly 43 may also include mounting hooks 42 at an upper portion of the support post 44. Further, in some embodiments (see, e.g., FIGS. 4D and 6C) the support post assembly may also include lower mounting hooks 45 at a lower portion of the support post 44 for engaging a lower portion of the fence panel assemblies. The mounting hooks may be used to engage the fence panel assemblies 21 and particularly the mounting openings 40 of the fence post assemblies 21.

Figure 4E:
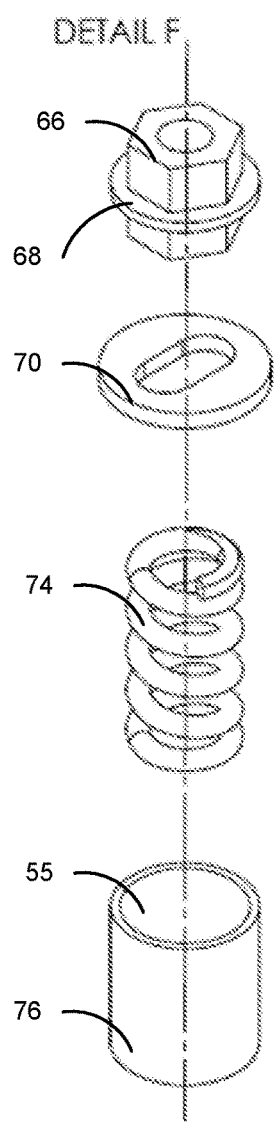
FIG. 4E is a detailed view of a portion of the anchor post assembly of Detail F shown in FIG. 4D according to one or more aspects described herein.
Figure 4F:
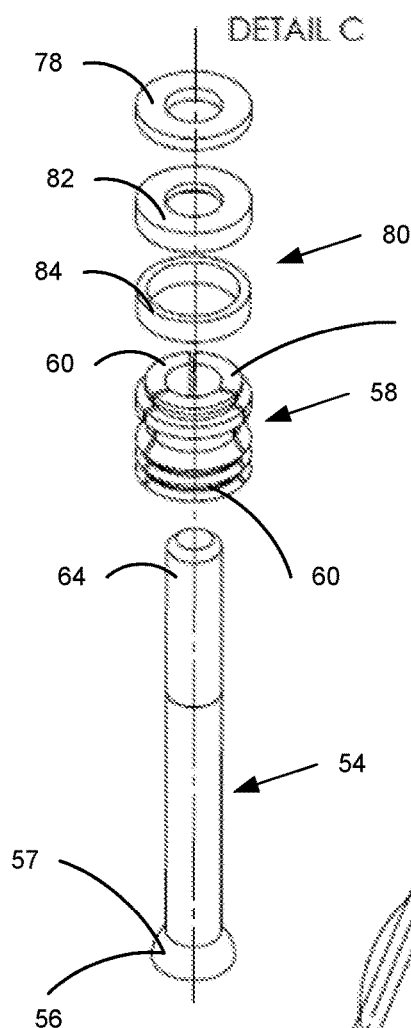
FIG. 4F is a detailed view of a portion of the anchor post assembly of Detail C shown in FIG. 4D according to one or more aspects described herein.
Figure 4D:
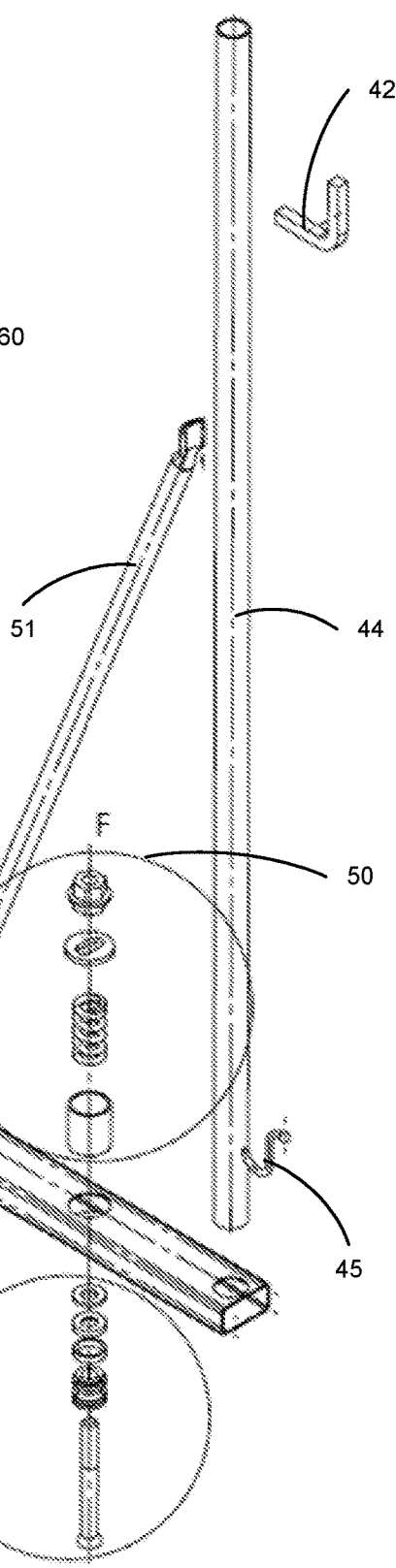
FIG. 4D is an exploded perspective view of an anchor post assembly according to one or more aspects described herein.

The support post assembly 43 may also include a base 53. The base 53 extends generally horizontally and is configured to engage the floor 52 to which support post assembly 43 is anchored. As shown in FIG. 4A, the base 53 may be formed of two L-shaped brackets, however, any suitable base 53 may be used. For example, as shown in FIG. 4D the base 53 may be a rectangular hollow tube. The support post assembly 43 may also include one or more braces 51 connecting the base 53 to the support post 44. These braces 51 may add additional rigidity to the support post assembly 43. As shown in FIGS. 4A-4B, the support post assembly 43 may include an aperture 55 through the base 53. And as shown in FIG. 4A, the aperture 55 may be formed by a cylindrical sleeve 76 welded to the base 53, however, other methods of forming aperture 55 may be used. For example, the base 53 may simply include an aperture 55 extending through the base 53.

The support post assembly 43 may be removably engaged with the floor 52 using an anchor assembly 50 extending through the aperture 55. As described above, the depth to which the anchor assembly 50 may penetrate a concrete floor 52 in a high-rise building is usually limited to a certain depth because of underlying service ducting, support cabling and electrical cabling which is buried in the concrete. In some instances, such ducting and cabling may only be one inch beneath the surface of the concrete floor 52. Therefore in embodiments discussed herein the depth that the anchor assemblies 50 penetrate the floor 52 may be limited to less than or equal to about 1 inch, or less than or equal to about ¾ inch. The anchor assemblies discussed herein must also be able to withstand a certain amount of pulling pressure so that the assemblies 10 are not accidentally removed from the floor 52 which would create a dangerous situation especially with high-rise buildings. Thus, in some embodiments the anchor assemblies discussed herein may be able to withstand a load of at least 1000 pounds of pull pressure, or a load of at least 1500 pounds of pull pressure. This is a significant improvement over many previous anchors which often required 3 to 4 inches of penetration in order to secure a load of 1500 pounds of pull pressure. In other words, the shallow anchor of the invention can withstand pull pressures equal to if not greater than anchors that are embedded four to five times deeper into a concrete floor. Plus, the anchors of the invention will not hit or contact the embedded cabling or ducting within the concrete unlike known anchors in which this could happen.

Anchor assembly 50 includes a bolt or rod 54 having a spreader 56 at a bottom end of the bolt 54, the spreader 56 having a tapered surface 57 which enlarges toward the bottom end of the bolt 54. The anchor assembly 50 also includes an anchor sleeve 58 through which the bolt or rod 54 may be inserted. The anchor sleeve 58 includes a plurality of gripping segments 60. These gripping segments may be formed of a metallic or polymeric material. The gripping segments 60 have an inner surface 60A and an outer surface 60B. The inner surface 60A may be generally smooth and may have a generally curved shape. Additionally, in some embodiments the inner surface may be tapered such that the thickness of the gripping segments 60 is greater at the top end than at the bottom end. The outer surface 60B of the gripping segments 60, as best shown in FIGS. 4C, 5B, and 5C, may include a plurality of raised ridges 63 forming grooves 61. These raised ridges 63 and/or grooves 61 may be used to engage the wall of the hole drilled into the floor 52. In one embodiment, the anchor sleeve may be less than ¾ inches in height and less than ¾ inches in diameter. This anchor sleeve may then be used with a corresponding drilled receiving hole that is ¾ inches or less in depth and ¾ inches or less in diameter. In other embodiments, depending upon the required load, the anchor sleeve 58 and/or hole may have different dimensions. Generally, the diameter and/or height of the anchor sleeve may be increased for situations requiring higher loads and decreased for situations requiring lower loads. For example, in some embodiments, the diameter of the anchor sleeve 58 may be less than about 1 inch, less than about 1.5 inches, less than about 2 inches, or less than about 3 inches. The holes could then be made at corresponding diameters to fit the anchor sleeves 58. Similarly, in some embodiments, the height of the anchor sleeve 58 may be less than about 1 inch, less than about 1.5 inches, less than about 2 inches, or less than about 3 inches, or less than about 6 inches; and the corresponding holes could be made at the correct depth to fit the anchor sleeves 58.

As best shown in FIGS. 4C and 5C, the gripping segments 60 may be connected to each other by a flexible elastomeric member 59. In one embodiment, the elastomeric member 59 may comprise an elastomeric portion 62, or multiple elastomeric portions 62 extending between and/or bonded to each of the gripping segments 60. As shown in FIG. 5C, the elastomeric member 59 comprises a plurality of elastomeric portions 62 extending between and bonding the gripping segments such that the inner surface of the anchor sleeve 58 has a generally circular cross-sectional shape.

The flexible elastomeric portion 62 connects the plurality of gripping segments 60, forming a unitary body. Because of the flexible elastomeric material 62, the anchor sleeve 58 may flex outward, or transversely to the axial direction of the bolt 54. Thus, as a downward force is applied to the anchor sleeve 58, the anchor sleeve is forced over the tapered surface 57 of the spreader 56 causing the gripping segments 60 to move outward at a bottom portion of the anchor sleeve 58. The bottom gripping elements will move outward first thereby causing the anchor to first engage the inside surface of the receiving hole at its bottom where the concrete is the strongest. The outward movement of the anchor sleeve (beginning at the bottom of the receiving hole) thereby exerts increasing pressure on the inside surface of a receiving hole in a floor 52. This outward pressure exerted by the anchor sleeve 58 secures the bolt or rod 54 to the floor 52. In some embodiments, the anchor sleeve is sized such that the top edge of the anchor sleeve seats below the surface of the concrete floor 52. This sub-surface positioning allows the gripping segments 60 to engage the inner wall of the receiving hole and may prevent the gripping segments 60 from chipping the concrete floor at the upper edge of the receiving hole. The anchor sleeve of the invention is usable with all types and conditions of concrete, including concrete that is not quite fully cured.

Figure 6A:
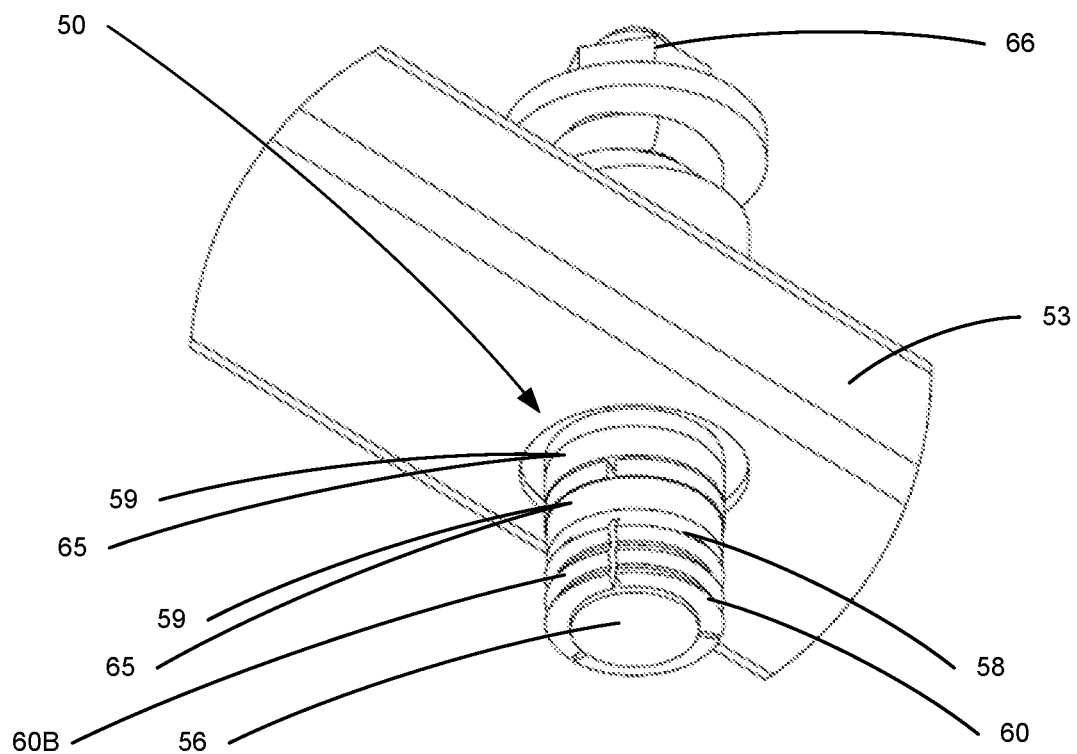
FIG. 6A is a perspective view of an anchor assembly in a closed position according to one or more aspects described herein.
Figure 6B:
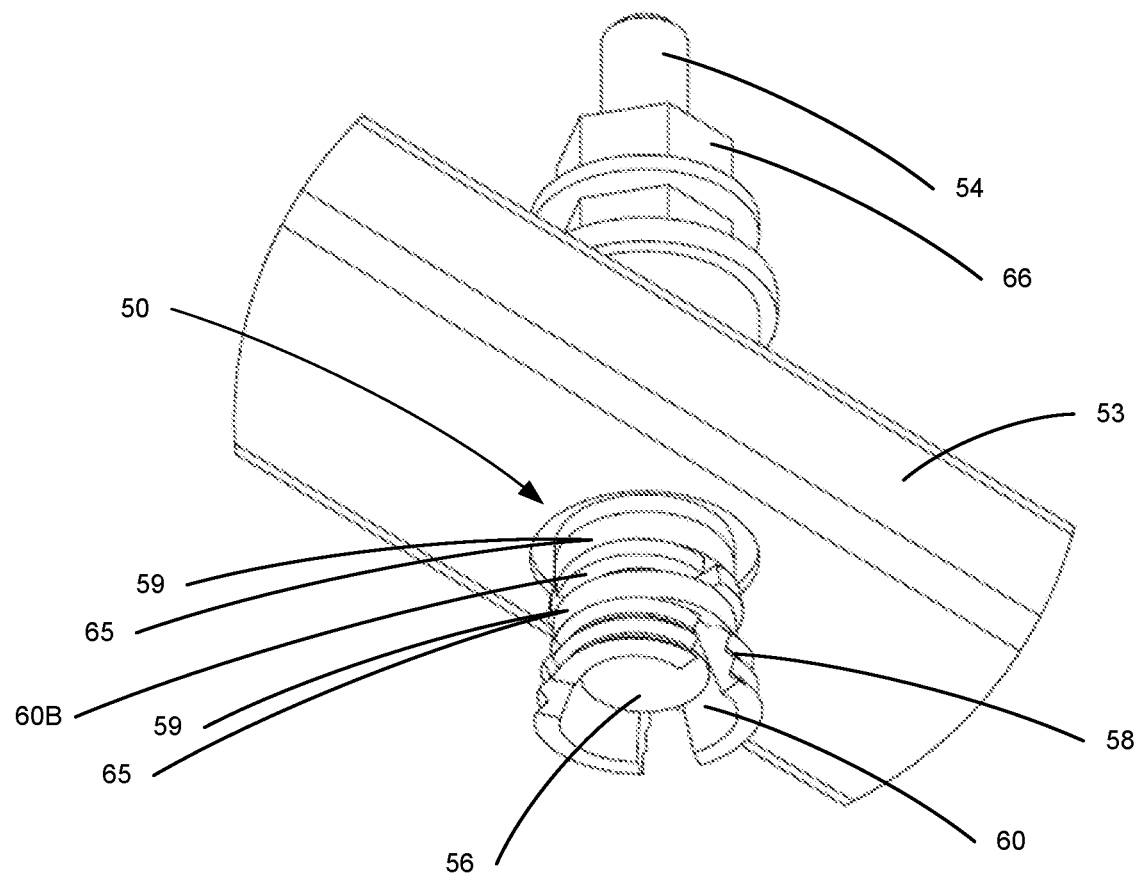
FIG. 6B is a perspective view of an anchor assembly in an extended or open position according to one or more aspects described herein.

In an alternative embodiment, the gripping segments 60 of the anchor sleeve 58 may be joined by an elastomeric member 59 comprising one or more elastomeric bands 65. These elastomeric bands or O-rings 65 may wrap around the outer surface 60B of gripping segments 60 to hold the segments 60 together. Such a configuration is shown in FIGS. 6A (in a closed position) and 6B (in an extended position). Additionally, this configuration is shown installed with a fence post assembly 43 in a floor 52 in FIGS. 6C, 6D (in a closed position) and 6E (in an extended position). Further, this configuration of the anchor sleeve 58 is also shown in FIGS. 4D-4F, and FIGS. 5D-5F. The bands 65 may be positioned on an outer surface 60B of the gripping segments 60 and/or in the external grooves 61 of the gripping segments 60. Any number of bands 65 may be used to hold the segments together. In the exemplary embodiment of FIGS. 6A and 6B, at least two bands are used to hold the segments 60 together. In another exemplary embodiment, at least three or more bands are used to hold the segments 60 together.

Advantageously, the spreader 56 is positioned to engage a bottom portion of the anchor sleeve 58. This allows for the anchor sleeve 58 to expand at its lower portion first and engage the inside surface of the receiving hole at its bottom where the concrete is the strongest. However, in other alternative embodiments, the anchor sleeve 58 may be configured to spread at its top end first, or the anchor sleeve 58 may spread substantially evenly along the length of the anchor sleeve 58. For example, in one embodiment, the spreader 56 may be inverted and positioned above the anchor sleeve 58. In this embodiment the spreader 56 may be moved downward onto the anchor sleeve causing the upper portion of the anchor sleeve 58 to expand first. In another embodiment, there may be a spreader 56 below the anchor sleeve 58 and an inverted spreader above the anchor sleeve 58. In such an embodiment the anchor sleeve 58 may spread substantially even over its length as the as the two spreaders engage the anchor sleeve 58. In still other embodiments, the anchor assembly 50 may not include a spreader 56. In embodiments without a spreader 56 the inner surface 60A of the anchor sleeve 58 may be tapered such that the thickness of the gripping segments is greater at the bottom end than at the top end.

The anchor assembly 50 may include additional components. As best shown in FIGS. 4A-5E these additional components may be shaped or sized differently and/or may be omitted or combined with other components. As best shown in FIGS. 4C and 5B, the bolt or rod 54 may have a threaded portion 64 that receives a nut 66. As described above, the nut 66 may provide the downward force on the anchor sleeve 58 which spreads outward as it passes over the spreader 56. In some embodiments, the anchor assembly 50 may also include a washer 68 disposed below the nut 66. Additionally, in some embodiments the anchor assembly 50 may include a stop flange 70 disposed below the washer 68. And in some embodiments, the stop flange 70 may engage a load gauge 72.

The load gauge 72 may be configured to indicate when the desired load has been applied by the nut 66 such that a user knows that sufficient load has been applied to move the anchor sleeve 58 downward over the spreader 56. The load gauge 72 may include a coiled spring 74 captured in a cylindrical sleeve 76 or other hole 55. The load gauge 72 may also include a bottom flange 78 below the coiled spring 74. A washer assembly 80 may be located between the anchor sleeve 58 and the flange 78. In some embodiments, the washer assembly 80 may include an elastomeric or rubber washer 82 disposed over a metal washer 84, and in other embodiments the washer assembly 80 may comprise a single washer. In some embodiments washer 84 may surround an upper portion of the anchor sleeve 58.

In use, the load gauge 72 may be used by moving the nut 66 downward by an impact wrench or other similar tool until the coiled spring 74 is no longer visible. The coiled spring 74 may be sized such that once the coiled spring 74 is substantially within the cylindrical sleeve 76, the anchor sleeve 58 is exerting sufficient lateral force on the hole in the floor 52 to retain the support post assembly 43 in the floor 52. Exemplary drawings of a load gauge 72 are shown in FIGS. 6D and 6E. As shown in FIGS. 6D, a portion "G" of the coiled spring 74 is visible. This indicates that the anchor sleeve 58 is not sufficiently engaged within the hole and that the nut 66 must be tightened further. FIG. 6E shows the anchor assembly 50 after the nut 66 has been tightened further. In this position the coiled spring 74 is no longer visible indicating that the anchor assembly 50 is sufficiently engaged within the hole.

For facilitating inspection and the determination that the required load has been applied, the coiled spring 74 may be painted a distinctive color such as red or yellow. If the color of the spring remains visible, this indicates that the proper load has not been applied to spring and the nut 66 needs to be driven further by the impact wrench. In an alternative embodiment, certain portions of the load gauge 72 and/or anchor assembly 50, such as the cylindrical sleeve 76, which serves as the gauge, can be omitted. Advantageously the coiled spring 74 may also assist in reducing the vibration of the nut 66, washers 68, 70, 80 and bolt 64 which may prevent them from loosening during use. Further the coiled spring 74 may assist in maintaining the downward force on the anchor sleeve 58. In an alternative embodiment, the gauge may be omitted and the spring may be painted or otherwise marked to indicate that the proper load has been applied. In yet another alternative embodiment, no color markings are used on the spring 74. In other words, the support post assembly may be used with or without the gauge 72.

As shown in FIGS. 7-7C, once a user has installed the support post assemblies 43 into the floor 52 using anchor assemblies 50, the user may then attach the fence panel assemblies 21 to the support post assemblies 43. As shown in FIGS. 7-7C mounting hooks 42 may be inserted through mounting openings 40 to secure the fence panel assemblies 21 to the support post assemblies 43. As shown in FIG. 7B, the mounting hooks 42 may be sized such that two overlapping fence panel assemblies 43 may be mounted on a single mounting hook 42. A bottom portion of the fence panel assembly 21 may be attached to the support post assembly 43 using locking cable ties 49 or other similar method. The mounting hooks 42 will carry the weight of the fence panel assemblies, thereby allowing the fence panel assembly to be made in a lighter weight and more economical manner as described herein.

Figure 8A:
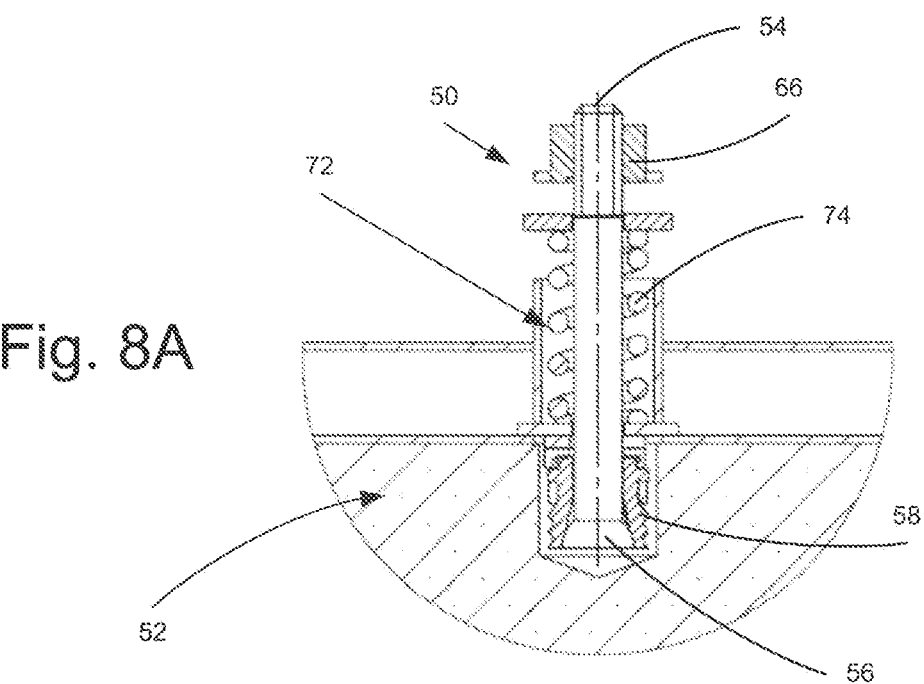
FIG. 8A is a side cross-sectional view of a portion of an anchor assembly according to one or more aspects described herein.
Figure 8B:
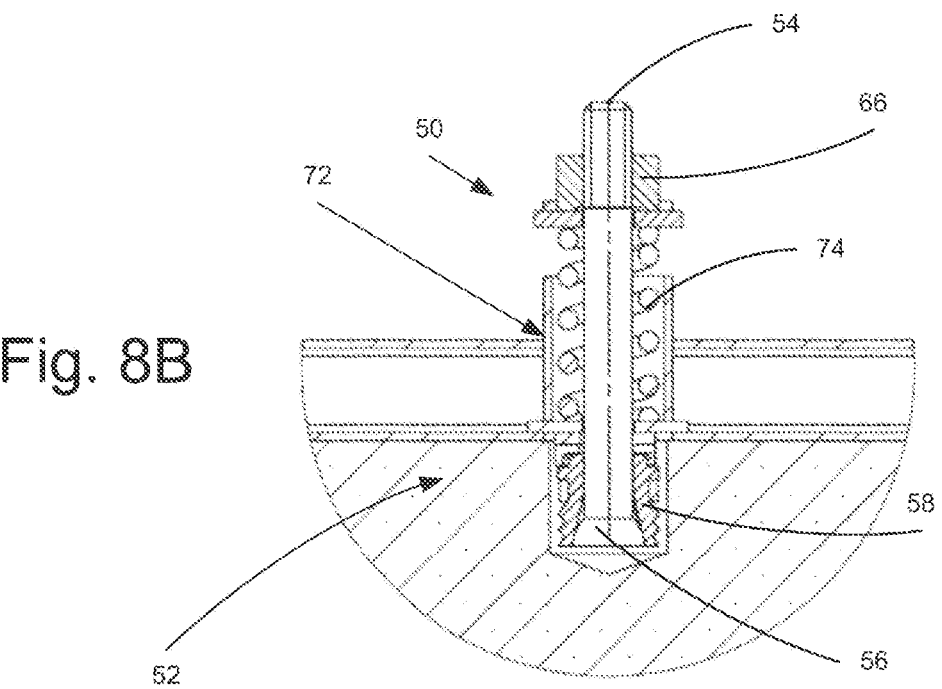
FIG. 8B is a side cross-sectional view of a portion of an anchor assembly according to one or more aspects described herein.
Figure 9:
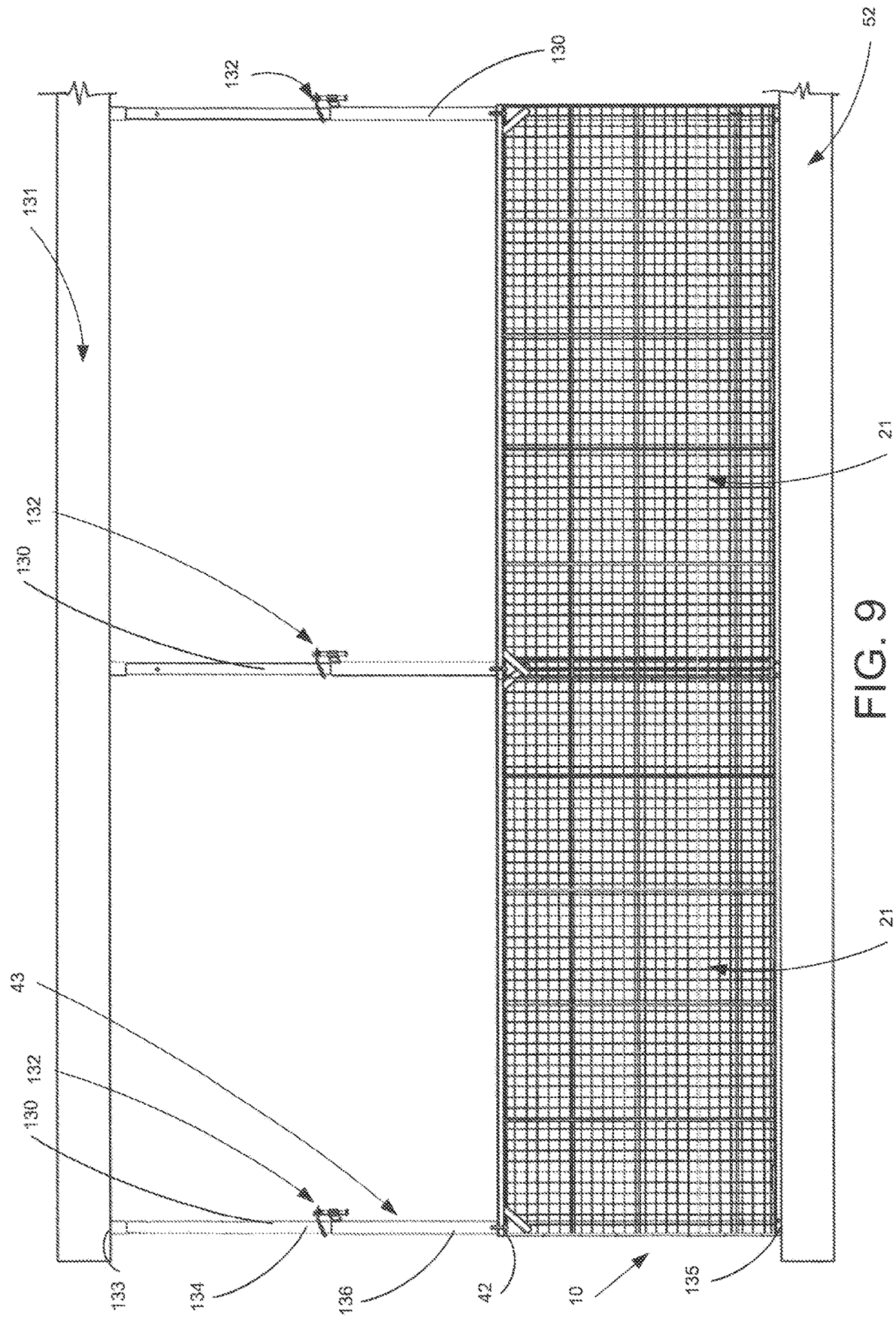
FIG. 9 is a front view of a security fence assembly having telescoping anchor post assembly according to one or more aspects described herein.
Figures 9B, 9C:
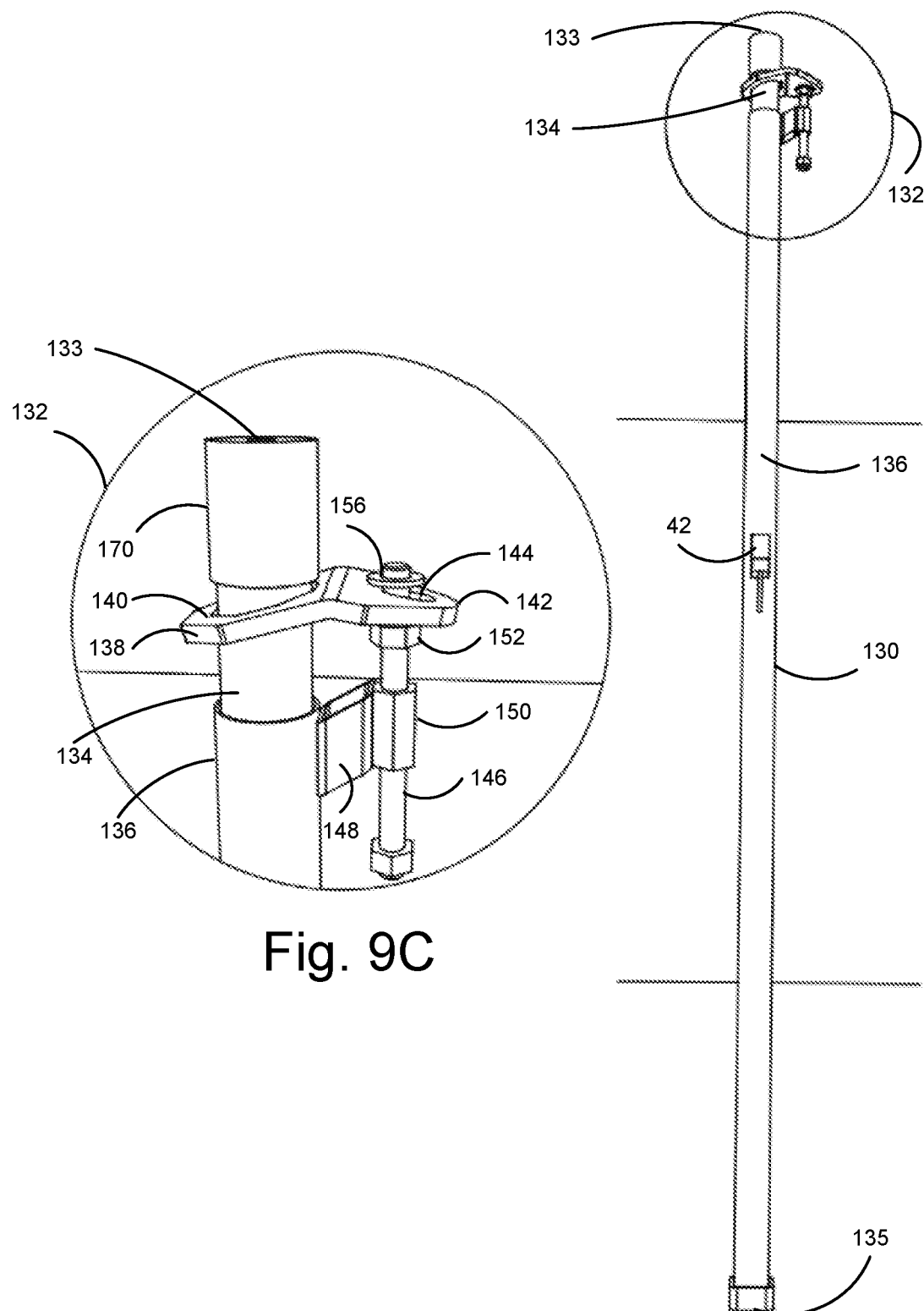
FIG. 9B is a front view of a telescoping anchor post assembly according to one or more aspects described herein.
FIG. 9C is a detailed view of the telescoping anchor post assembly of the portion shown in FIG. 9B according to one or more aspects described herein.

The anchor assembly 50 may include safety features to ensure that worn or old parts are not used. For example, in some embodiments, the nut 66 and/or stop flange 70 may be painted a distinctive color that when worn off will indicate that the assembly may need to be replaced. Additionally, when the nut 66 and/or flange 70 show visible signs of wear, this will further indicate that the assembly may need to be replaced. In other embodiments the nut 66 and/or the bolt or rod 54 may be manufactured such that the nut 66 can no longer be tightened if the anchor assembly 50 components, such as the nut 66 and/or threaded portion 64, are worn out. For example, as shown in FIG. 8A the anchor assembly is shown in an unworn condition. However, as shown in FIG. 8B, the anchor assembly is shown in a worn condition wherein the nut 66 cannot provide the downward force necessary to force the anchor sleeve 58 over the spreader 56. These fail indicators designed into the system further provide additional safety for a system that by its nature is required to be safe and is required achieve certain safety standards for high-rise buildings.

Grab Plate

In an alternative embodiment illustrated in FIGS. 9-13B, the support post assembly 43 may be a telescoping post 130, which has a top end 133 extending to the ceiling 131 and a bottom end 135 extending to the floor 52. Fence panel assemblies 21 may be attached to telescoping post 130 similarly to the methods described above including the use of mounting hooks 42 that may included on the telescoping support post 130.

As shown in FIGS. 9-13B, the telescoping post 130 may include a first upper portion or inner tube or inner cylindrical tube 134 and a second lower portion or outer tube or outer cylindrical tube 136. As shown in FIGS. 9-13B, the first portion or inner tube 134 may have a reduced diameter compared to the second portion or outer tube 136 such that the first portion 134 may slide within the second portion 136. The telescoping post 130 may also include a grab plate assembly 132 for retaining the inner cylindrical tube 134 in an extended position relative to an outer cylindrical tube 136. A user may generally operate the telescoping post 130 by extending the inner post 134 upwards relative to the outer post 136 by hand until the telescoping post 130 spans substantially the entire distance between the floor 52 and the ceiling 131. The user may then use the grab plate assembly 132 to extend the inner tube 134 further upward until the telescoping post 130 is fully engaged between the floor 52 and the ceiling 131. In some embodiments, the telescoping post 130 may be anchored to the ceiling 131 at its top end 133 similarly to the anchoring shown in U.S. Pat. No. 8,152,118, which is incorporated herein by reference. And in some embodiments the upper portion of the telescoping post 130 may be similar to the telescoping post show in U.S. Pat. No. 7,510,152, which is incorporated by reference.

The grab plate assembly 132 includes a grab plate 138 that has a tube receiving opening 140. The tube receiving opening 140 may have a polygon shape such as a hexagon, heptagon, octagon, nonagon, decagon, hendecagon, or dodecagon. Because of the polygon shape, the tube receiving portion defines a plurality of contact points 141, as best shown in FIGS. 10A and 11, for contacting a reduced diameter portion of the inner tube 134. The plurality of contact point 141 may provide sufficient retention of the inner cylindrical tube 134 even if the tube 134 has a generally round cross-sectional shape or a generally oval cross-sectional shape. Additionally, the plurality of contact points 141 may prevent ovaling of the inner tube 34. This is because the loading on the inner tube is spread across the multiple contact points 141. In an alternative embodiment, the number of contact points may be six or eight points to further spread the load evenly onto the tube thereby preventing ovaling of the tube.

The grab plate 138 extends into an integral lever arm 142. The lever arm 142 may be angled from the main body of the grab plate 138. The lever arm 142 defines a slot 144 for receiving an actuating rod or bolt 146 carried by a bracket 148 fixed to the outer cylindrical tube 136. The bracket 148 includes a nut 150 through which the bolt 146 is threaded and the bolt 146 carries a fixed nut or bushing 152 to engage the grab plate 138 from one side of the lever arm 142. In some embodiments the grab plate assembly 132 may include a first washer 154 seated on the nut 152. Turning the actuating bolt 146 in the opposite direction will engage the grab plate 138 from the opposite side of the lever arm 142 with a second washer 156 or fixed nut or end. Conveniently, a torque wrench, or other similar device, may be used to apply sufficient torque to lock the telescoping post 130 in position. In doing so, it will be appreciated that additional contact points are created between the actuating bolt 146 and the lever arm 142 of the grab plate 138.

Figure 12:
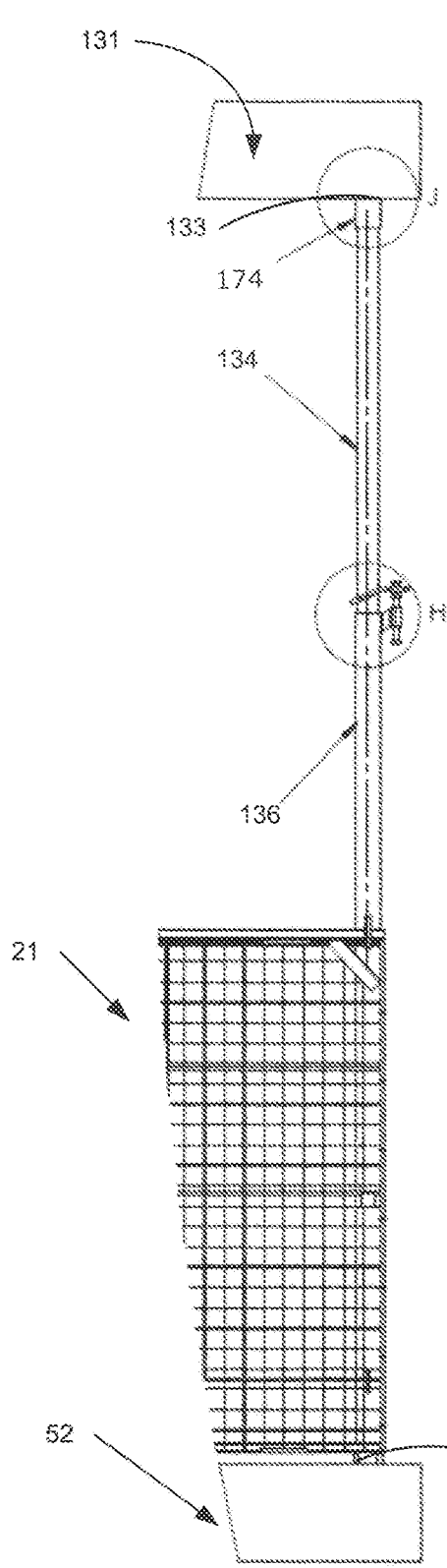
FIG. 12 is a side view of a portion of a security fence assembly having telescoping anchor post assembly according to one or more aspects described herein
Figure 12B:
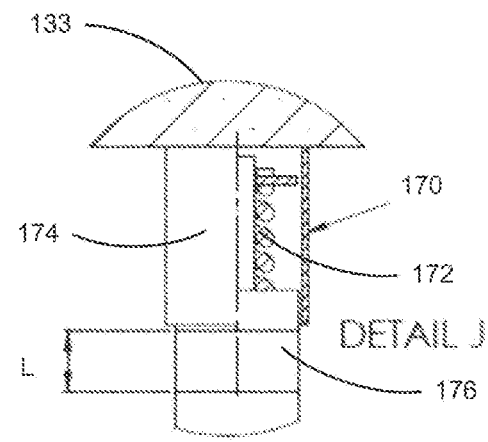
FIG. 12B is a detailed view of the telescoping anchor post assembly of Detail J shown in FIG. 12 shown in an unengaged position according to one or more aspects described herein.
Figure 12A:
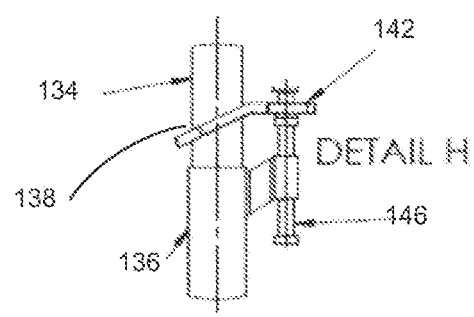
FIG. 12A is a detailed view of the telescoping anchor post assembly of Detail H shown in FIG. 12 according to one or more aspects described herein.
Figure 12C:
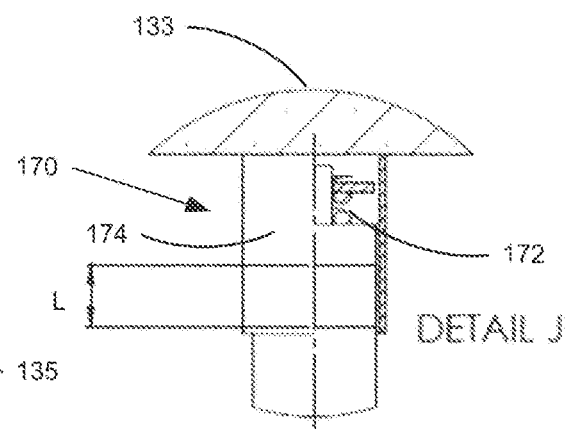
FIG. 12C is a detailed view of the telescoping anchor post assembly of Detail J shown in FIG. 12 shown in an engaged position according to one or more aspects described herein.

In some embodiments, the telescoping post 130 may include a load gauge 170 which may be configured to indicate when the desired load has been applied between the floor 52 and the ceiling 131 by the telescoping post 130. The load gauge 170 may include a coiled spring 172 captured within the inner tube 134. The load gauge may also include a cap 174 which fits over the inner tube 134. A portion of the inner tube 130 may be made visibly different 176 than the rest of the inner tube 130. The visible difference may be a different paint coloring for example. This visible difference is indicated as "L" in FIGS. 12B and 12C. In use, the load gauge 170 may be used to determine when the telescoping post 130 is sufficiently engaged. As the inner tube 134 moves upward, the cap 174 will cover the visibly different portion 176 of the inner tube 134. Once the entire visibly different portion 176 is covered by the cap 174 then sufficient load has been applied to the telescoping post 130. FIG. 12B depicts the load gauge 170 before sufficient load has been applied where the visibly different portion 176 of the inner tube 134 is visible. And FIG. 12C depicts the load gauge 170 after sufficient load has been applied where the visibly different portion 176 of the inner tube 134 is covered by cap 174.

In certain embodiments the nut 152 and/or other portions of the grab plate assembly 132 may include a wear system or visible indicia of wear which may alert a user when the grab plate assembly 132 must be replaced. For example, the nut 152 may be painted or otherwise colored. After the color on the nut 152 wears off, this is an indication that the system may need to be replaced. Similarly, if the threads on the bolt 146 show signs of wear, this also is an indication that the system may need to be replaced. Also, if the slot 144 in the lever arm shows wear around the edges of the slot, this is an indication that the system should be replaced. In some embodiments the lever arm 142 may include a wear indicator which may comprise one or more marks on the lever arm 142. These marks may indicate a specified number of uses that the grab plate assembly 132 may be used before it must be replaced. As these marks are worn off a user will have an approximate indication of the remaining number of uses before the grab plate assembly 132 must be replaced. Further, in some embodiments, and as evident from FIGS. 13-13B, the slot 144 may wear around the edges such that the fixed nut or bushing 152 moves into the slot 144 and cannot rotate further. This is an additional sign of wear. These fail indicators designed into the system further provide additional safety for a system that by its nature is required to be safe and is required achieve certain safety standards for high-rise buildings.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A grab plate assembly for retaining a first tube relative to a second tube in a support post assembly, the first and second tubes having generally circular cross sections, the grab plate assembly comprising:
   a bracket mounted to the second tube and having engaged therewith an actuating rod;
   a grab plate with a tube receiving opening for receiving the first tube therethrough, the tube receiving opening polygonal in shape such that orienting the grab plate at a non-perpendicular angle to the first tube when the first tube is received through the opening causes contact between the grab plate and the first tube at four or more points about an outer surface of the first tube; and
   a lever arm extending from and at an angle to the grab plate, the lever arm having a first side, an opposed side, and an oval slot extending from the first side to the second side for slidably receiving the actuating rod there though;
   wherein the actuating rod is configured to extend through the oval slot and to engage the lever arm such that movement of the actuating rod in a first direction relative to the bracket causes the lever arm to be lifted, the actuating rod to slide along a longitudinal axis of the oval slot, and the grab plate to engage the first tube at the four or more points of contact causing the first tube to be lifted relative to the second tube, and wherein movement of the actuating rod in a second opposite direction causes the lever arm to be lowered and the grab plate to disengage the first tube.

2. The grab plate assembly safety of claim 1, wherein the first and second tubes have complimentary cross-sections, with the first tube telescopically receivable within the second tube.

3. The grab plate assembly of claim 2, wherein the tube receiving opening has an octagonal shape.

4. The grab plate assembly of claim 1, wherein the actuating rod is configured to raise the first tube relative to the second tube by rotating the actuating rod.

5. The grab plate assembly of claim 4, wherein the threaded portion of the bracket is a threaded nut fixed to the bracket.

6. The grab plate assembly of claim 4, further comprising a stopper secured to the bolt proximate the opposed side of the lever arm,
   wherein rotating the bolt in the second opposite direction draws the stopper into engagement with the opposed side of the lever arm to (i) draw the lever arm toward the bracket, (ii) pivot the grab plate, and (iii) disengage the grab plate from the first tube, thereby permitting the first tube to be telescopically received within the second tube.

7. The grab plate assembly of claim 4, further comprising a wear system to indicate wear of the grab plate assembly, the wear system comprising the nut being colored a distinctive colour.

8. The grab plate assembly of claim 1, wherein the grab plate assembly further comprises a wear system configured to alert a user when the grab plate assembly requires replacing.

9. The grab plate assembly of claim 1, wherein the support post assembly further comprises a load gauge configured to indicate when the desired load has been applied between a floor and a ceiling by the support post.

10. The grab plate assembly of claim 9, wherein the load gauge further comprises:
    a coiled spring within the first tube;
    a visibly different portion of the first tube which is visibly different than remaining portions of the first tube;
    a cap extending over the first tube and engaged with the coiled spring, the cap configured to cover the visibly different portion of the first tube when a desired load has been applied between the floor the ceiling by the support post.

11. The grab plate assembly of claim 1, wherein the actuating rod is a bolt that threadably extends through a threaded portion of the bracket and that slidably extends through the oval slot of the lever arm, the bolt having a bushing fixed thereto proximate the first side of the lever arm when the bolt extends through the oval slot, wherein rotating the bolt in the first direction forces the bushing to engage the first side of the lever arm to (i) drive the lever arm away from the bracket, (ii) pivot the grab plate, and (iii) engage the grab plate with the first tube at the four or more points of contact, thereby driving the first tube away from the second tube.

12. A support post assembly for releasable engagement with a floor and a ceiling, the support post assembly comprising:
    a first tube telescopically received within a second tube, and
    the grab plate assembly of claim 1 for retaining the first tube in an extended position relative to the second tube between the floor and the ceiling.

13. The support post assembly of claim 12, wherein the support post further comprises a top end for engaging the ceiling, a bottom end for engaging the floor, and a load gauge to indicate that a desired load has been applied between the floor and the ceiling by the support post, the load gauge comprising a cap dimensioned to cover a top end of the post and a coil spring positioned between the top end of the post and an inner surface of the cap, the spring biasing the cap away from the post.

* * * * *